United States Patent [19]
Deguchi et al.

[11] Patent Number: 6,133,984
[45] Date of Patent: Oct. 17, 2000

[54] IMAGE FORMING APPARATUS

[75] Inventors: Takashi Deguchi; Toru Kawabe; Tuyosi Hattori, all of Hino, Japan

[73] Assignee: Konica Corporation, Tokyo, Japan

[21] Appl. No.: 09/198,245

[22] Filed: Nov. 24, 1998

[30] Foreign Application Priority Data

Nov. 28, 1997 [JP] Japan ..................................... 9-343794

[51] Int. Cl.⁷ ........................... G03B 27/52; G03B 27/72; G03B 27/32
[52] U.S. Cl. .................................. 355/40; 355/35; 355/27
[58] Field of Search ................................ 355/27–29, 35, 355/40, 41; 347/133, 247–248, 253, 237

[56] References Cited

U.S. PATENT DOCUMENTS

| | | | |
|---|---|---|---|
| 4,774,547 | 9/1988 | Uchida et al. ............................. | 355/27 |
| 5,182,576 | 1/1993 | Miwa ....................................... | 346/108 |
| 5,518,844 | 5/1996 | Matsumoto et al. ...................... | 430/30 |
| 5,801,813 | 9/1998 | Morimoto et al. ........................ | 355/27 |
| 5,815,244 | 9/1998 | Tokuda .................................... | 355/41 |

*Primary Examiner*—Russell Adams
*Assistant Examiner*—Hung Henry Nguyen
*Attorney, Agent, or Firm*—Finnegan, Henderson, Farabow, Garrett & Dunner, L.L.P.

[57] ABSTRACT

There is described an image recording apparatus, which includes an input device for inputting image data, a recording element to record images on an image recording medium in accordance with the image data, a memory device for storing a plurality of information groups having relationship between image data and recording energy control data, a discriminator for discriminating a sort of the image recording medium, a selector for selecting at least one information group out of the plural information groups in accordance with the sort of the image recording medium discriminated by the discriminator, and a controller for controlling the recording element on the basis of the information group selected by the selector.

14 Claims, 21 Drawing Sheets

250 PHOTOGRAPHIC PAPER

| WITHOUT ADJUSTMENT | WITH ADJUSTMENT |
|---|---|
| 2048 | 2048 |
| 1024 | 1024 |
| 512 | 514 |
| 256 | 258 |
| 128 | 130 |
| 64 | 66 |
| 32 | 34 |
| 16 | 18 |
| 8 | 10 |
| 4 | 6 |
| 2 | 4 |
| 1 | 3 |

| (A) PHOTOGRAPHIC PAPER CONDITIONS | (B) PHOTOGRAPHIC PAPER OPTIMUM CONDITIONS |
|---|---|
| 2048 | 2300 |
| 1024 | 1200 |
| 514 | 526 |
| 258 | 262 |
| 130 | 130 |
| 66 | 66 |
| 34 | 34 |
| 18 | 18 |
| 10 | 10 |
| 6 | 6 |
| 4 | 4 |
| 3 | 3 | ature 1
IMAGE FORMING APPARATUS

BACKGROUND OF THE INVENTION

The present invention relates to an image forming apparatus which forms an image on a recording material by employing a recording element, and more particularly, to an image forming apparatus having therein a storage means that stores plural recording energy control data (hereinafter, referred to as recording energy control units), a discriminator means for discriminating the kinds of recording materials and means for switching a setting of the recording energy control units based on information discriminated by the discriminator means.

In an image recording apparatus wherein a silver halide photosensitive material is subjected to exposure and recording in accordance with image information, there is known a system employing a print head (array-type head) in which a plurality of recording elements (light sources) are arrayed in a line, as a method having various merits such as low cost, a compact apparatus, a easiness to obtain high quantity output, etc.

There has been proposed an apparatus wherein a vacuum fluorescent tube light source called VFPH (Vacuum Fluorescent Print Head) is used as the print head, stated above. The vacuum fluorescent tube light source has special features such as easily obtained high luminance, quick response and a slim body. By the way, a zinc oxide phosphor is selected as a phosphor mainly from the viewpoint of durability.

Further, an LED array light source is sometimes used in conjunction with the aforesaid print head, and with regard to a red color, in particular, a high density array such as 300 dpi or 400 dpi can be manufactured through a photomask method, whereby it is possible to create a structure employing an LED array as a red color light source and employing the VFPH mentioned above as a green color light source and a blue color light source, for example.

In recent years, there has been attempted development of an image recording apparatus wherein a silver halide color photosensitive material is subjected to digital exposure conducted by the array-type print head stated above, and then is subjected to automatic development.

In the image recording apparatus in which the digital exposure unit stated above is incorporated, continuous tone presentation is realized by changing luminous time of each recording element, as a method to record images through density modulation.

However, the luminous time can not be established individually for each recording element, and there is a restriction that the only available control is to allow all pixels to emit light for the same period of time or not to allow light emission at all. In addition, for the exposure, there is frequently conducted scanning exposure which, however, has a restriction that the time required to record one pixel is fixed because the scanning speed in such scanning exposure is determined to be constant in advance.

Under the restriction stated above, a bit separation multiple exposure system is used to speedily and efficiently control light emission in the digital exposure.

For example, a duration of 2.8 msec is divided into 12 luminous time ($2^n$ wherein n=0–11) including $2^0$, $2^1$, $2^2$, $2^3$, $2^4$, $2^5$, $2^6$, $2^7$, $2^8$, $2^9$, $2^{10}$ and $2^{11}$ in advance as shown in FIG. 15, and a combination of ON/OFF activations of the 12 luminous times is used.

Namely, to obtain a continuous tone, the unit of the 12 luminous times mentioned above are stipulated as $2^n$ (separated in a binary system).

In the case of an LED, one bit corresponds to 100 nsec, while, in the case of VFPH, one bit corresponds to 300 nsec.

Therefore, when trying to emit light for the period of (1) 6400 nsec by the use of an LED, exposure of 64 bits representing $2^6$, namely, single exposure of n=6 is enough.

When trying to emit light for the period of (2) 6300 nsec, on the other hand, it is necessary to conduct exposure 6 times, which corresponds to n=0–5, because $63=32(=2^5)+16(=2^4)+8(=2^3)+4(=2^2)+2(=2^1)+1(=2^0)$.

However, when exposing a photosensitive material by the use of the aforesaid unit of luminous times, there are caused the following problems;
(1) neither the rise nor the fall is zero in switching characteristics of light sources for light emission, and
(2) energy for obtaining continuous tone can not be realized by a simple sum of time because photosensitive materials have high intensity reciprocity law failure characteristics and multiple exposure characteristics.

With regard to the problem (2) above, in particular, it varies depending on the types and layer structures of the photosensitive materials, which can also be a problem. Accordingly, when images are outputted onto a photosensitive material of a different type with a fixed unit of luminous time, it is impossible to obtain a continuous tone, which is a problem.

The problems stated above are also caused on a heat generating body, in addition to the case wherein a recording element is a light emitting element, and a solution of the problems is delayed.

SUMMARY OF THE INVENTION

An objective of the invention, therefore, is to provide an image forming apparatus wherein an image excellent in continuous tone can be obtained, in spite of a different type of a photosensitive material, when forming an image on a recording material, by using a recording element.

The following embodiments are given as preferable embodiments of the invention.
(1) A recording element is a light emitting element, and various recording materials are silver halide photosensitive materials.
(2) A discriminator means is a means to discriminate recording materials directly. When the aforesaid recording material is a roll-type photosensitive material, a discriminating action of the discriminator means is performed by detecting information which is provided on the tip of a photosensitive material to discriminate the photosensitive material, and also information in regard to whether the photosensitive material is a combination of one, two or more bar codes, punched holes, reflectance in light irradiation, and surface density or surface color.
(3) A discriminator means is a means which discriminates information provided on a package means of a recording material.
(4) A discriminator means is a means which discriminates information of the width of the recording material.
(5) A discriminator means is an automatic discriminating means.
(6) A recording element is a light emitting element, and a recording energy control unit is the emission control time of the recording element, or the recording energy control unit is only a combination of emission control time, or the emission control time is $a \times 2^n \pm \alpha$ (nsec) (provided that a represents a coefficient for converting to time, and $\alpha$ is an adjustment factor), and further, the light emitting element is incorporated in an array-type head.

(7) A recording element is a heat generating body, and recording energy control unit is heat generation control time.

DETAILED DESCRIPTION OF THE PREFERRED EMBODIMENT

Figure 1:
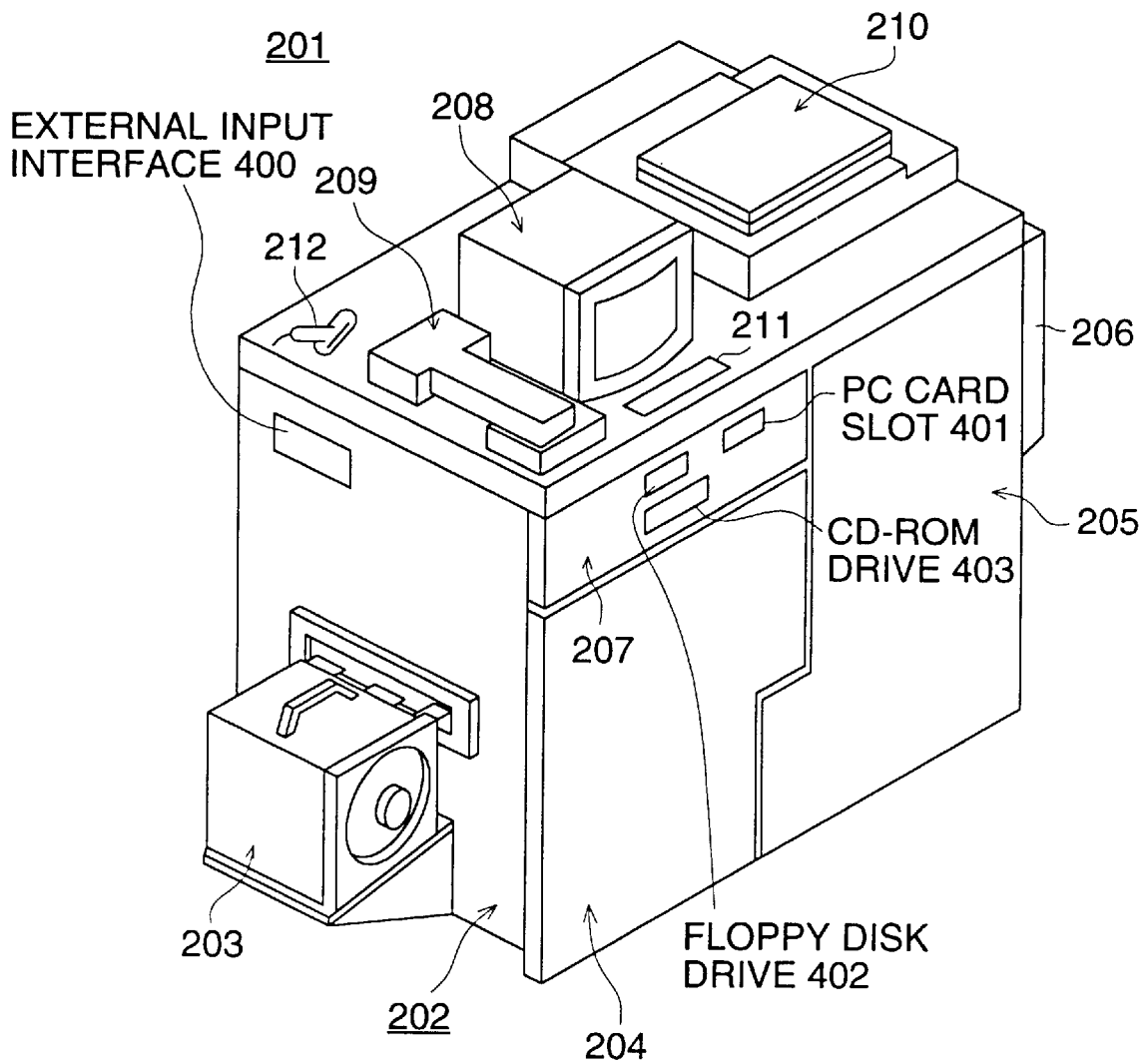
FIG. 1(a) is a perspective view of a print forming apparatus.
FIG. 1(b) is a schematic structural diagram of a print forming apparatus.
Figure 1:
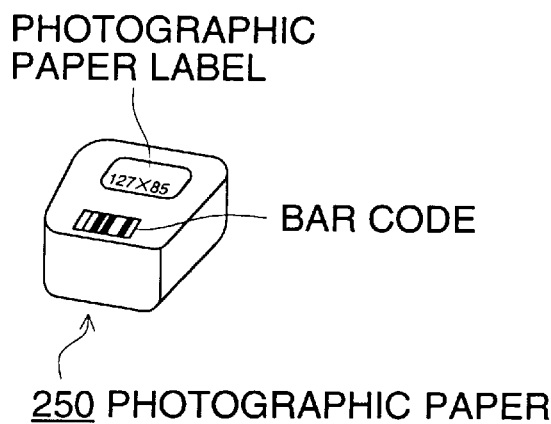

As a recording material applied to the invention, silver halide photosensitive materials of different types are preferable, and photosensitive materials of a paper type apply in particular.

The photosensitive materials of different types means various photographic paper such as those made by various manufacturers, those having different layer structures, professional-use photographic paper, amateur-use photographic paper, transmission type photographic paper, black and white photographic paper and photographic paper in different sizes.

In addition to the foregoing, recording materials applied to the invention include photosensitive materials such as negative type photosensitive materials, X-ray film(s) and black and white film(s).

In the invention, recording elements used for digital exposure include those of a luminous type and those of a heat generating type. As a luminous type, either an array head or a laser head is available. As the array head type, an LED array and VFPH are usually employed. As stated in the prior art, it is also possible to employ a structure wherein an LED array is used for a red light source and the VFPH is used for a green light source as well as a blue light source.

It is preferable that light emitting elements are incorporated in an array head in which the light emitting elements are arrayed either in a single row or in plural rows. In the case of plural rows, it is also possible to array the light emitting elements in a staggered form. The number of array heads may be either singular or plural. In case of plural heads, three arrays can be arranged separately for each of the B, G, R colors. Plural arrays may either be fixed separately on the surface of a recording material, or be fixed solidly on a single fixing member.

The means to form an image is not particularly limited, and an ordinary image forming method including developing (color developing in the case of color images), bleaching and/or fixing (including bleaching and fixing), stabilizing and/or washing and drying can be used when a recording material is a silver halide photosensitive material. From the viewpoint of down-sized processing equipment and improvement for ease of operation, automatic processing equipment is used as an apparatus, and recently down-sized automatic processing equipment which is commonly employed, and called a mini-lab, is also preferable.

In the invention, as a storage means storing plural recording energy control units, a hard disk (HDD), a floppy disk (FD), a flash memory, FPGA, ROM (EP-ROH, EEP-ROH etc.), etc. are acceptable.

When a recording element is of a light emitting type, for example, the recording energy control unit is equivalent to a light emitting control time of the recording element or an amount of light emission of it, and the light emitting control time of the recording element is preferable. When a recording element is of a heat generating type, the recording energy control unit is equivalent to heat generating control time or an amount of heat generation, and the heat generating control time is preferable.

In the following description, the embodiment of a light emitting type, employed as a recording element, will be mainly described.

FIG. 1 is a perspective view of a print making apparatus.

Print making apparatus 201 is equipped with magazine loading section 203 on the left side of apparatus main body 202, and inside apparatus main body 202 there are provided exposure processing section 204, which conducts exposure on a photosensitive material, and development processing section 205 which processes exposed photosensitive material and dries it to make a print, and the print thus made is ejected on tray 206 provided on the right side of apparatus main body 202. There is further provided control section 207 on the upper portion of the exposure processing section 204 inside the apparatus main body 202.

On the top of apparatus main body 202, there is arranged CRT 208. On the left side of CRT 208, there is arranged film scanner section 209 which is a reading device for a transmission type document, while on the right side, there is arranged reflection type document input device 210. On the front side of the CRT 208, there are arranged key board 211 and bar-code reading device 212. When photographic paper is loaded in a magazine, the magazine is set on a channel that matches the photographic paper, and then, bar codes, provided on the outer bag of the photographic paper, are read so that information of the type of the photosensitive material in the magazine and the size of the photographic paper may be stored in memory.

Figure 1B:
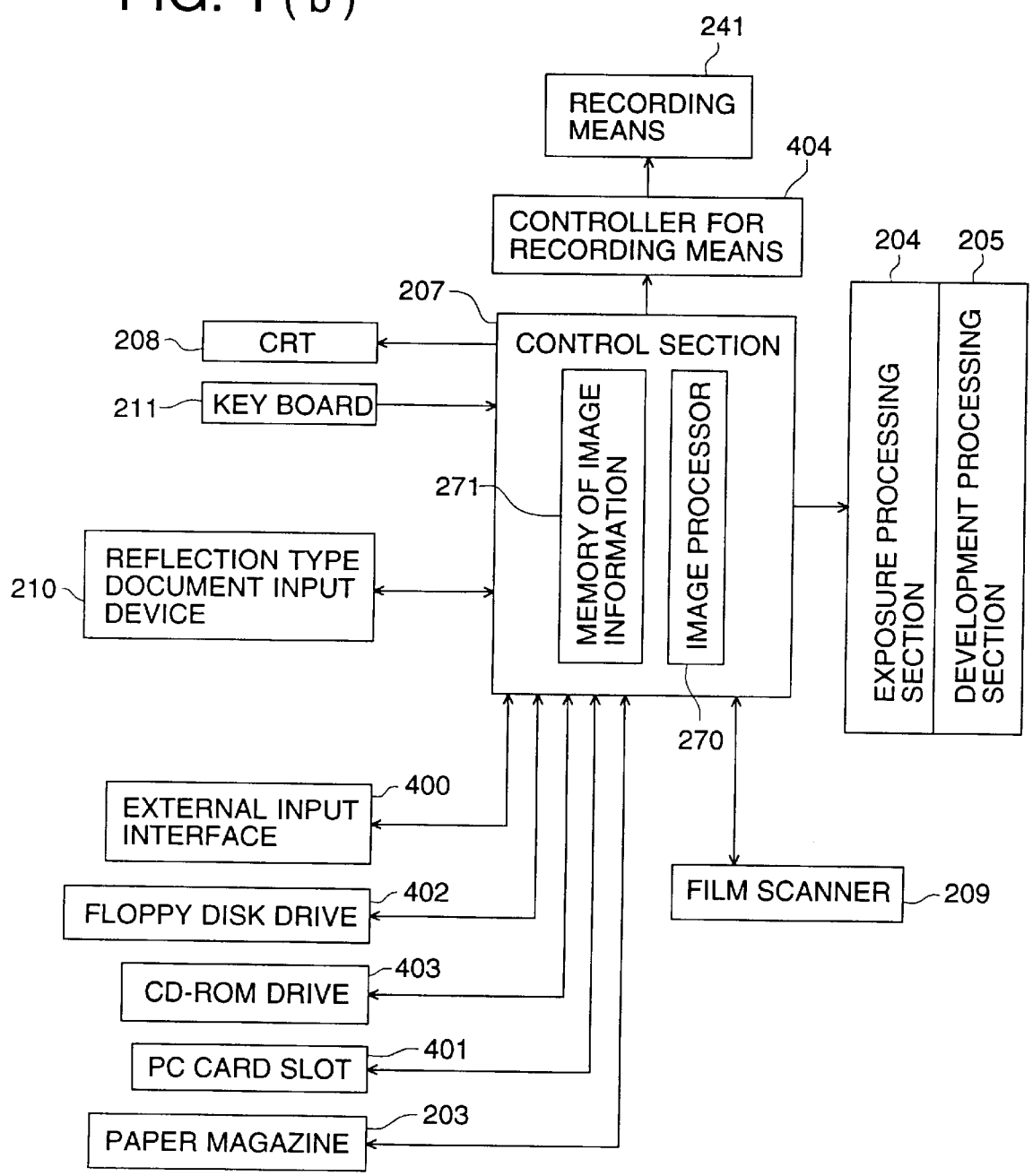

FIG. 1(b) is a schematic structural diagram of a print making apparatus.

Based on information coming from key board 211, control section 207 of print making apparatus 201 conducts reading of document information coming from film scanner section 209 or from reflection type document input device 210, reading of image information from a digital camera or a digital video camera by means of external input interface 400 or PC card slot 401, and reading of image information from various recording media by means of floppy disk drive 402 or CD-ROM drive 403, and thereby obtains image information to display on CRT 208. Control section 207 has therein image processing section 270 which processes the image information mentioned above to form image information for exposure use, and sends it to exposure processing section 204, together with the paper magazine information. In exposure processing section 204, a photosensitive material is exposed to images, then the photosensitive material is sent to development processing section 205 where the exposed photosensitive material is developed, then, processed and dried, and thus a print is made.

Image processing for image information includes image processing wherein color images obtained through photographing under inappropriate photographing conditions such as under exposure or over exposure and recorded on a color film or a reversal film, for example, are read and thereby color images having desired color and gradation are made as image information, image processing to change various inputted image information to color images having desired color and gradation which are different from those of the inputted image information, and further, image processing to obtain, through conversion of various inputted image information conducted by a spatial filter, the image offering the same effect as that of an image given a soft focus effect, by conducting multiple exposure, thus, it is possible to increase services available on a print making apparatus, and thereby, to enhance utility value.

Figure 2:
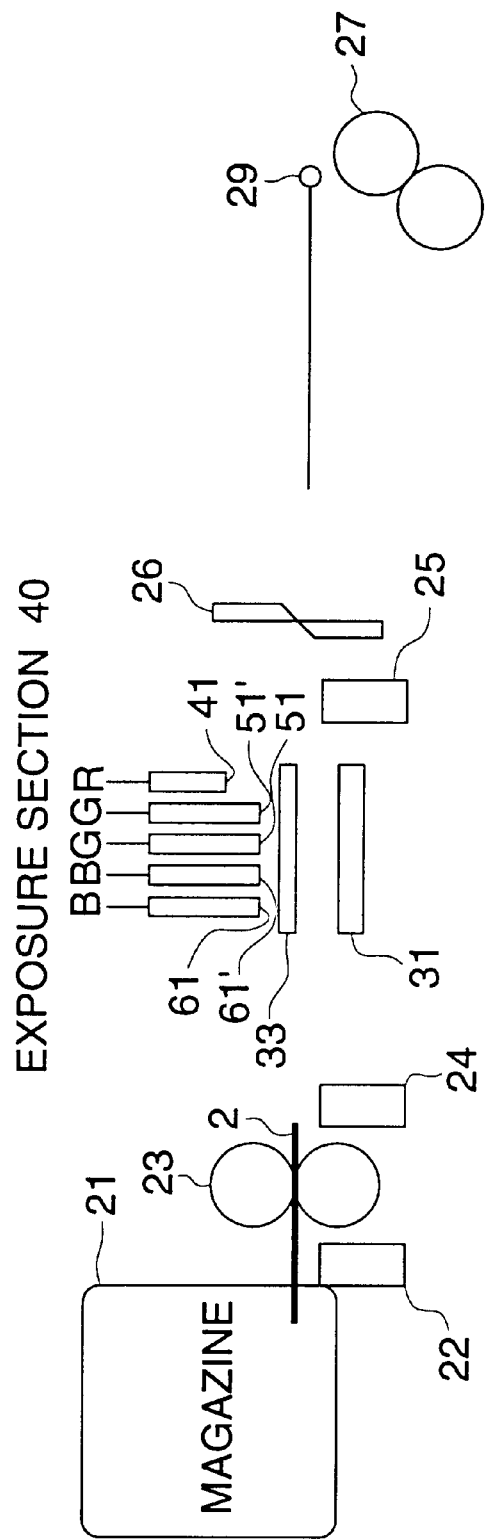
FIG. 2 is a schematic structural front view of an image recording apparatus of example 1.
Figure 3:
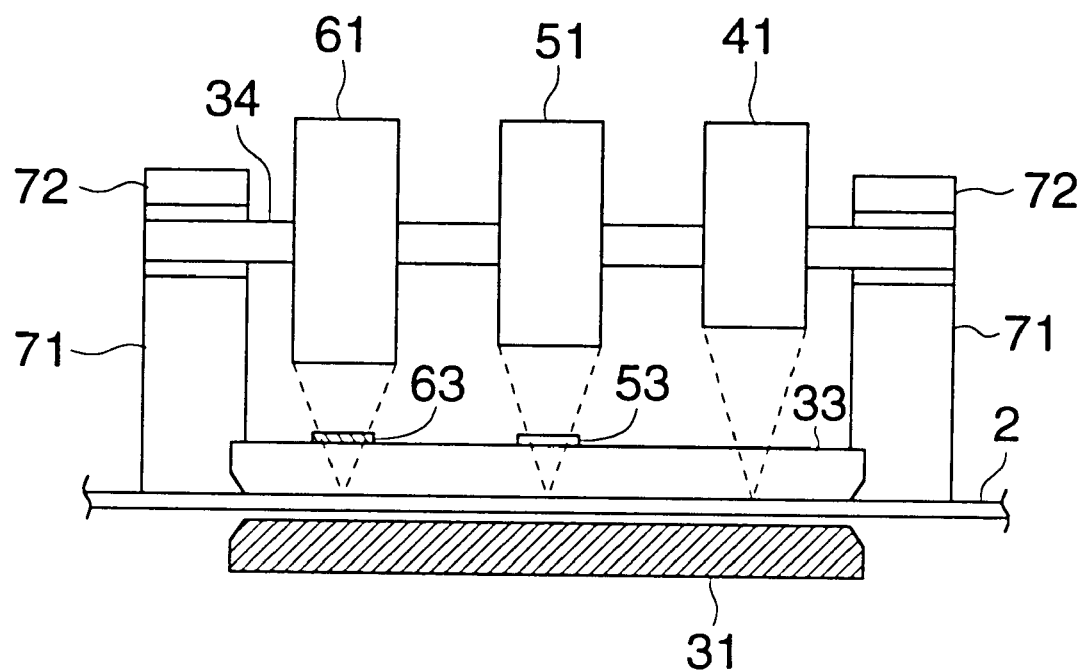
FIG. 3 is a schematic structural front view of an exposure section of an image recording apparatus of example 1.

Next, a front view of the outline structure of an image recording apparatus of the present example will further be explained, referring to FIG. 2. Further, a front view of the outline structure of an exposure section of the image recording apparatus of the present example is shown in FIG. 3.

The image recording apparatus of the present example has a red light-use recording head 41, green light-use recording heads 51 and 51', blue light-use recording heads 61 and 61', an exposure section 40 to expose printing paper 2, a conveyance roller pair 23 and a conveyance roller pair 27 which are conveyance means for conveying the printing paper 2 exposed by the exposure section 40, a cutter 26 to cut off the printing paper 2 exposed by the exposure section 40 from the remaining portion of the printing paper 2, a development processing section (not shown) to developing-process the printing paper 2 cut off by the cutter 26, and a flapping plate 29 to guide the printing paper 2 to the development processing section when it is lifted, and not to guide the printing paper 2 to the development processing section when it is lowered.

Further, the present image recording apparatus is provided with a magazine setting section which can set a magazine 21 in which a roll-like printing paper 2 is accommodated, in a predetermined direction and a position; a magazine detecting sensor 22 to detect whether the magazine 21 is set in the magazine setting section or not and to detect printing paper information; a standby sensor 24 to detect passage of the leading edge or trailing edge of the printing paper 2 drawn from the magazine 21; and a position sensor 25 to detect the leading edge of the printing paper 2 and to detect whether the printing paper 2 exists at the detecting position of the sensor or not. The magazine detecting sensor distinguishes paper sizes, image quality, etc.

The leading edge position of the printing paper 2 is detected by information of the position sensor 25 and information of a counter for a driving pulse of a driving step motor of the conveyance roller pair 23. The leading edge position of the detected printing paper 2 is used for cutting the printing paper 2 or positioning the leading edge of the printing paper 2 from the position of the standby sensor 24 to the standby position of the magazine 21 side.

The exposure section 40 exposes an image on the printing paper 2 by the red light-use recording head 41, green light-use recording heads 51 and 51' and blue light-use recording heads 61 and 61'. In the exposure section 40, a transparent glass plate 33 is provided between the red light-use recording head 41, green light-use recording head 51, blue light-use recording head 61, and the printing paper 2. The lower end surface of the transparent glass plate 33 is the reference surface for exposure of the red light-use recording head 41, green light-use recording heads 51 and 51' and blue light-use recording heads 61 and 61'. The printing paper 2 is positioned on the reference surface by the transparent glass plate 33, so that a blur of the image by shifting of the exposure surface from the reference surface is prevented. Further, a damage of the recording head or the printing paper 2 caused by contact of the printing paper 2 with the red light-use recording head 41, green light-use recording heads 51 and 51' and blue light-use recording heads 61 and 61' is prevented, and it is prevented that it becomes an obstacle for conveyance and causes non-uniformity in conveyance, or jamming.

A conveyance roller pair 23 to draw and return the printing paper from or to the magazine 21 set in a predetermined position is provided in the image recording apparatus. The subsidiary scanning is conducted when the printing paper 21 is conveyed to return to the magazine 21 by the conveyance roller pair 23, and the printing paper 2 which is being conveyed, is exposed by the exposure section 40 in the primary scanning direction. A cutter 26 is provided between the exposure section 40 and the development processing section in the image recording apparatus. A portion of the exposed leading edge side of the printing paper 2 is cut off from the unexposed remaining portion of the printing paper 2. Then, the printing paper 2 which is exposed and cut off, is development-processed by the development processing section.

In the exposure section 40, a fixing plate 34 to fix the red light-use recording head 41, green light-use recording heads 51 and 51' and blue light-use recording heads 61 and 61' is provided.

The image recording apparatus has a pressing member 31 to position the photosensitive surface of the printing paper 2 on the lower end surface of the transparent glass plate 33 when the printing paper 2 is exposed. When the printing paper 2 is exposed, the pressing member 31 presses the printing paper 2 on the transparent glass plate 33, and the pressing member 31 is separated from the transparent glass plate 33 in other cases.

Only during exposure, the printing paper 2 is pressed by the pressing member 31, and when being pressed, the printing paper 2 is conveyed between the pressing member 31 and the transparent plate in such a manner that it is drawn from between the pressing member 31 and the transparent plate.

The red light-use recording head 41 has a light emitting element group in which 300 dpi 2560 pieces of LED light emitting elements, whose peak wavelength is 665 nm and which is used as a light emitting section, are arranged dotted line-like on the linear line with a uniform interval, and a Selfoc lens array which is an aggregation of lenses by which light emission of each LED light emitting element is respectively focused on the photosensitive surface of the printing paper 2, is arranged at a predetermined position of the photosensitive material side of the light emitting element group.

Figure 4:
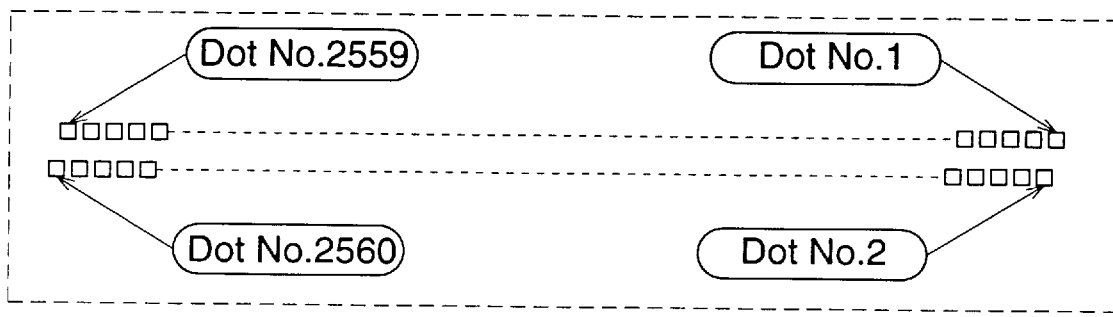
FIG. 4 is a conceptual arrangement diagram of an exposure section of VFPH used as a blue light recording head and a green light recording head of an image recording apparatus of example 1.

Both green light-use recording head 51 and blue light-use recording head 61 are fluorescent display tube type vacuum fluorescent print heads (VFPH) having fluorescent light emitting elements which emit the light of both wavelength areas of blue light and green light. A fluorescent substance light emitting element of a zinc oxide fluorescent substance (ZnO:Zn) which can simultaneously emit a light, is used as an light emitting section, and as shown in FIG. 4, the recording head has an light emitting element group in which 300 dpi 2560 light emitting elements are arranged, and a Selfoc lens array which is an aggregation of lenses by which light emission of each fluorescent substance light emitting element is respectively focused on the photosensitive surface of the printing paper 2, is arranged at a predetermined position of the photosensitive material side of the light emitting element group. As shown in FIG. 4, odd-numbered light emitting sections (Dot No. 1–No. 2559) and even-numbered light emitting sections (Dot No. 2–No. 2560) are respectively arranged dotted line-like on liner lines in 2 rows with an equal interval, and by arranging 2 rows of light emitting section groups zigzag, the light emitting element group is formed in which 300 dpi 2560 light emitting elements are arranged.

A blue filter (LEE filter sold by Konica color equipment Co.) is provided on the surface of the transparent glass plate 33 opposite to the blue light-use recording head 61 so that exposure is conducted by the blue light, and a yellow filter (HT015 soled by Konica color equipment Co.) is provided on the surface of the transparent glass plate 33 opposite to the green light-use recording head 51 so that exposure is conducted by the green light.

Figure 5:
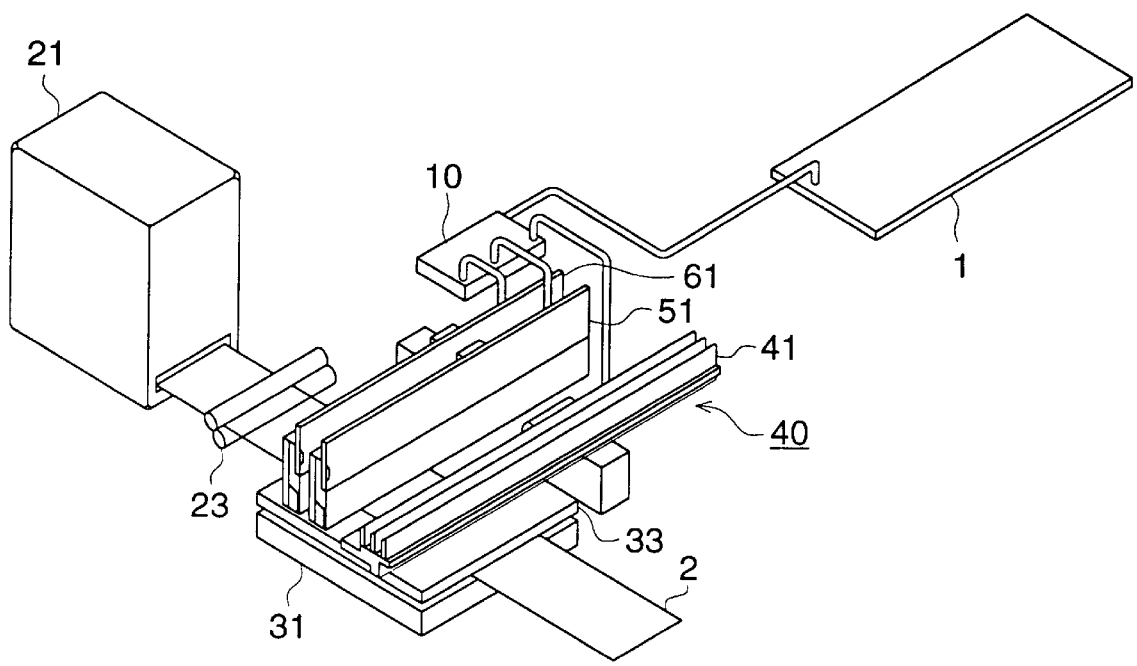
FIG. 5 is a schematic perspective view of surroundings of an exposure section of an image recording apparatus of example 1.

Next, the circuit structure of the image recording apparatus of the present example will be described according to FIG. 5 which is a perspective view of the outline relating to the exposure section 40 and its peripheral circuit.

The image processing control circuit 1 converts inputted color image data into image data for each primary color and transmits it to the signal processing section 10. The signal processing section 10 has a signal processing circuit for each primary color of B, G, R therein. The signal processing circuit for each primary color of the signal processing section 10 is respectively connected to the recording head 41, 51, 51', 61 or 61' which conducts exposure relating to the corresponding primary color. The signal processing section 10 generates each kind of signal for effective image recording of 1 line every time when a START signal is inputted which is transmitted every time when a predetermined amount of printing paper 2 is conveyed.

That is, the signal processing circuit for blue light and the signal processing circuit for green light in the signal processing section 10 generate 1 bit serial image data AL1, AL2, AL3, AL4, AR1, AR2, AR3, AR4, a latch control signal LOAD, an output control signal ESTBR, ESTBL, and a clock signal for data shift CLK from inputted image data, according to the START signal transmitted every time when a predetermined amount of printing paper 2 is conveyed, and send them to the recording heads 51 and 61. Then, the recording heads 51 and 61 cause each light emitting section to emit a light according to the sent signal.

Further, in the same manner, the signal processing circuit for red light in the signal processing section 10 also generates 1 bit serial image data, a latch control signal, an output control signal, a clock signal for data shift from inputted image data, according to the START signal transmitted every time when a predetermined amount of printing paper 2 is conveyed, and sends them to the recording head 41. Then, the recording head 41 causes each light emitting section to emit a light according to the sent signal.

Figure 6:
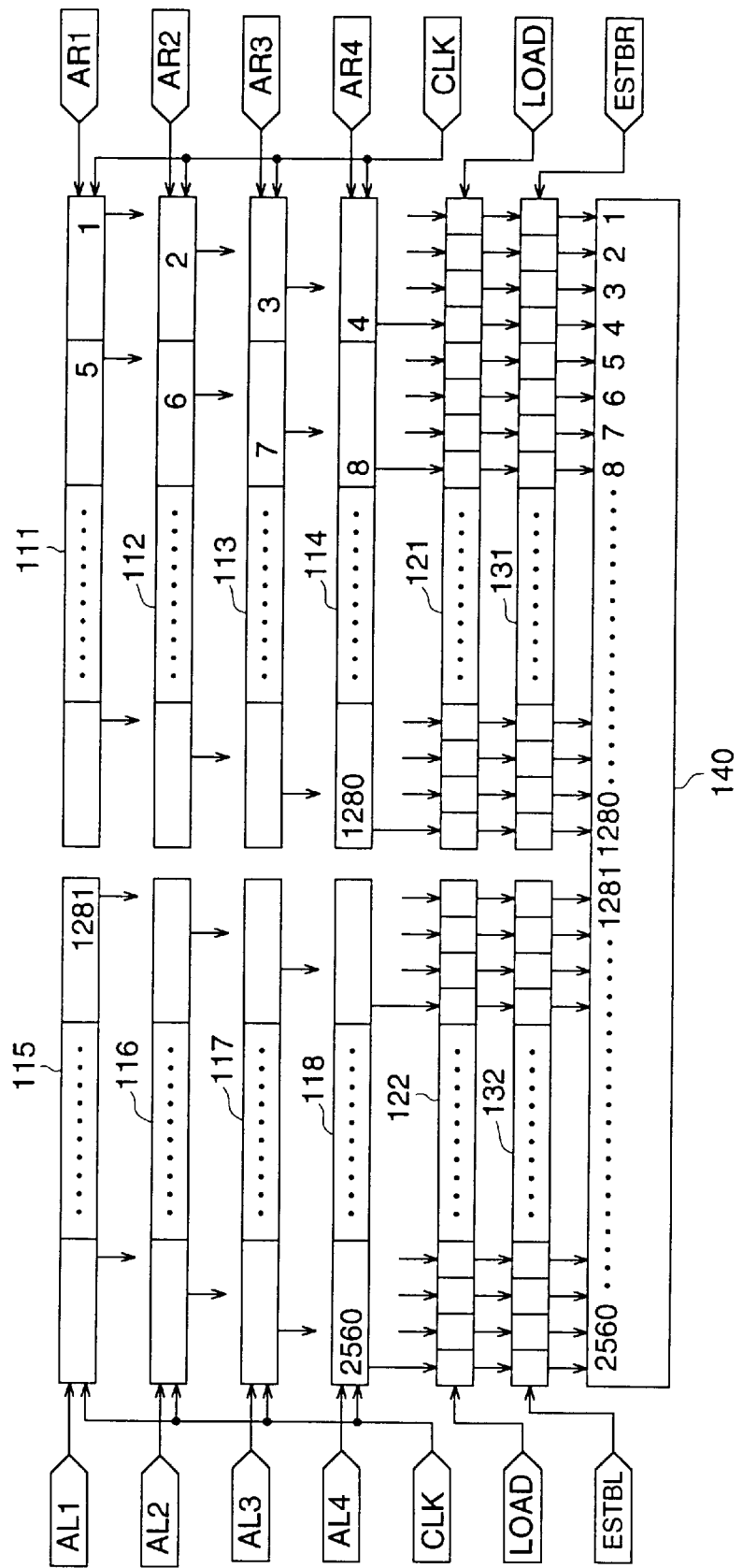
FIG. 6 is a circuit diagram of a recording head of an image recording apparatus of example 1.

Next, circuits inside the green light-use recording head 51 and the blue light-use recording head 61 will be explained according to FIG. 6 which is a circuit diagram of the circuits inside the recording heads 51 and 61. The recording heads 51 and 61 have therein shift registers 111–118, latch circuits 121, 122, gates 131, 132, and a recording head 140. A signal receiving section 71 receives 1 bit serial image data AL1, AL2, AL3, AL4, AR1, AR2, AR3, AR4, the latch control signal LOAD, output control signals ESTBR, ESTBL, and the clock signal for data shift CLK from the signal processing circuit of the signal processing section 10, and supplies them to each section as shown in FIG. 6.

Then, 1 bit serial data AR1 is set to the shift register 111, 1 bit serial data AR2 is set to the shift register 112, 1 bit serial data AR3 is set to the shift register 113, 1 bit serial data AR4 is set to the shift register 114, 1 bit serial data AL1 is set to the shift register 115, 1 bit serial data AL2 is set to the shift register 116, 1 bit serial data AL3 is set to the shift register 117, and 1 bit serial data AL4 is set to the shift register 118, in timed relationship with the clock signal CLK for data shift.

The latch circuit 121 latches 1 bit serial image data AR1–AR4 which are set to shift registers 111–114, according to the latch control signal LOAD. The latch circuit 122 latches 1 bit serial data AL1–AL4 which are set to shift registers 115–118, according to the latch control signal LOAD.

A gate 131 generates 1 bit driving signal of L or H from the output control signal ESTBR for each light emitting section, according to 1 bit serial image data latched by the latch circuit 121, and sends it to the recording head 140. A gate 132 generates 1 bit driving signal of L or H from the output control signal ESTBL in accordance with paper information for each light emitting section, according to 1 bit serial image data latched by the latch circuit 122, and sends it to the recording head 140. The recording head 140 drives each light emitting section by the driving signals generated by gates 131 and 132.

Incidentally, the output control signal ESTBL is 1 bit signal of H or L, and the gate 132 is driven by 1 bit serial image data when the output control signal ESTBL is H, and generates the driving signal of all L when the output control signal ESTBL is L. In the same manner, the output control signal ESTBR is 1 bit signal of H or L, and the gate 131 is driven by 1 bit serial image data when the output control signal ESTBR is H, and generates the driving signal of all L when the output control signal ESTBR is L. ESTBL or ESTBR selects the optimum time for the paper registered in advance on a signal generation control section.

Next, each signal processing circuit for green light and blue light of the signal processing section 10 which generates from inputted image signal, 1 bit serial image data AL1, AL2, AL3, AL4, AR1, AR2, AR3, AR4, the larch control signal LOAD, output control signals ESTBR, ESTBL, and clock signal CLK for data shift, which are sent to the green light-use and blue light-use recording heads 51 and 61, will be explained according to FIG. 7 which is an outline block diagram of the image processing section 10.

The signal processing circuit has a multiplier 11 to multiply correction data and image data sent from the image processing control circuit 1, in order to correct unevenness of light emitting characteristics of each light emitting section of the recording head; a correction data memory 12 to store the correction data sent from the image processing control circuit 1 and to supply it to the multiplier 11; a correction control section 13 to receive the control signal from the image processing control circuit 1 and the status signal of the memory writing control section 14, and to control the multiplier 11 and the correction data memory 12 corresponding to the control signal and the status signal and to send the status signal to the image processing control circuit 1; a memory writing control section 14 to write the image data corrected by the multiplier 11, in memories corresponding to each shift register of the recording head, by distributing the data to the memories; a memory group which is provided corresponding to each shift register of the recording head and stores 12 bit image data (MaR1, MaR2, MaR3, MaR4, MaL1, MaL2, MaL3, MaL4, MbR1, MbR2, MbR3, MbR4, MbL1, MbL2 MbL3, MbL4); a memory reading control section 15 to read 1 bit serial image data for each bit from each memory according to the clock signal CLK for data shift sent from a signal generation control section 16; an oscillator 17 to generates pulses having a predetermined frequency (for example, 20 MHz, that is, the period is 0.05 μsec.); and a signal generation control section 16 which generates the latch control signal LOAD and sends it to the latch circuits 121 and 122, according to the oscillation pulse from the oscillator 17 and the START signal generated each time when a predetermined amount of printing paper 2 is conveyed, and generates the output signal ESTBR and sends it to the right gate 131, and generates the output control signal ESTBL and sends it to the left gate 132, generates the clock signal CLK for data shift and sends it to each of shift registers 111–118, and sends 1 bit serial image data AR1, AR2, AR3, AR4, AL1, AL2, AL3, AL4, corresponding to each of shift registers 111–118, which are read by the memory reading control section 15, to respectively corresponding shift registers 111–118.

Then, the image data sent from the image processing control circuit 1 is multiplied by correction data in the multiplier 11, and corrected. The corrected image data is written in memories corresponding to each shift register of the recording head by the memory writing control section 14, by distributing the image data to memories.

The memory writing control section 14, the memory group, and memory reading control section 15 are used for generating 1 bit serial image data in each bit stage, that is, the memory reading control section 15 controls an address to read data from the memory group, and thereby, initially, as described later, in order to select a generation method of the serial image data at timing (1)–(4), in the 12 bit multi-contrast image data, the $11^{th}$ bit and the $10^{th}$ bit are read, and next, the $0^{th}$ bit, the $2^{nd}$ bit, the $4^{th}$ bit, the $6^{th}$ bit, the $8^{th}$ bit, the $9^{th}$ bit, the $7^{th}$ bit, the $5^{th}$ bit, the $3^{rd}$ bit, the $1^{st}$ bit, are successively read in the above order for each bit stage, so that 1 bit serial image data in each bit stage is generated.

In this connection, the 12 bit multi-contrast image data is the image data in which the gradation is expressed by 12 bits from the $11^{th}$ bit to the $0^{th}$ bit in the binary system. The $11^{th}$ bit which is the highest rank bit, is the largest digit and the $0^{th}$ bit which is the lowest rank bit, is the smallest digit. The expression that the memory reading control section 15 reads the 12 bit multi-contrast image data by each bit stage in the above-described order, means that a value of 1/0 of each digit of the 12 bit multi-contrast image data in the binary system is read by each 1 digit in the above-described order.

The memory group has memories for each shift registers 111–118, and when the memory reading control section 15 controls the address to read data from each memory, the 12 bit multi-contrast image data stored in each memory is read for each bit stage in the order of the $11^{th}$ bit, the $10^{th}$ bit, the $0^{th}$ bit, the $2^{nd}$ bit, the $4^{th}$ bit, the $6^{th}$ bit, the $8^{th}$ bit, the $9^{th}$ bit, the $7^{th}$ bit, the $5^{th}$ bit, the $3^{rd}$ bit, the $1^{st}$ bit, and thereby, the 1 bit serial image data in each bit stage, AR1, AR2, AR3, AR4, AL1, AL2, AL3, AL4 can be generated.

The memory group is divided into 2 systems of a memory system a composed of MaR1, MaR2, MaR3, MaR4, MaL1, MaL2, MaL3, and MaL4, and a memory system b composed of MbR1, MbR2, MbR3, MbR4, MbL1, MbL2, MbL3, and MbL 4. Then, the status in which the memory reading control section 15 reads data from the memory system b simultaneously when the memory writing control section 14 writes data in the memory system a, and the status in which the memory reading control section 15 reads data from the memory system a simultaneously when the memory writing control section 14 writes data in the memory system b, are alternately repeated. For this operation, the memory writing control section 14 sends a writing end signal showing that writing into the memory is completed, to the memory reading control section 15, and after the memory reading control section 15 receives the writing end signal, it starts reading from another memory system. The memory reading control section 15 sends a reading end signal showing that reading from memory is completed, to the memory writing control section 14, and after the memory writing control section 14 receives the reading end signal, it starts writing into another memory system. According to these operations, writing timing of the image data of the memory writing control section 14 and reading timing of the image data of the memory reading control section 15 can become independent of each other. Thereby, image data can be sent at high speed.

Then, the memory writing control section 14 generates a status signal showing the status in which writing into the memory was completed and received the reading end signal from the memory reading control section 15, that is, showing the status in which writing of the next image data is possible or not, and send the status signal to the correction control section 13. Then, the correction control section 13 generates the status signal showing the status in which the memory writing control section 14 can write the next image data and the multiplier 11 and the correction memory 12 have no trouble, that is, showing the status in which the next image data can be received or not, and sends the status signal to the image processing control circuit 1.

Figure 8:
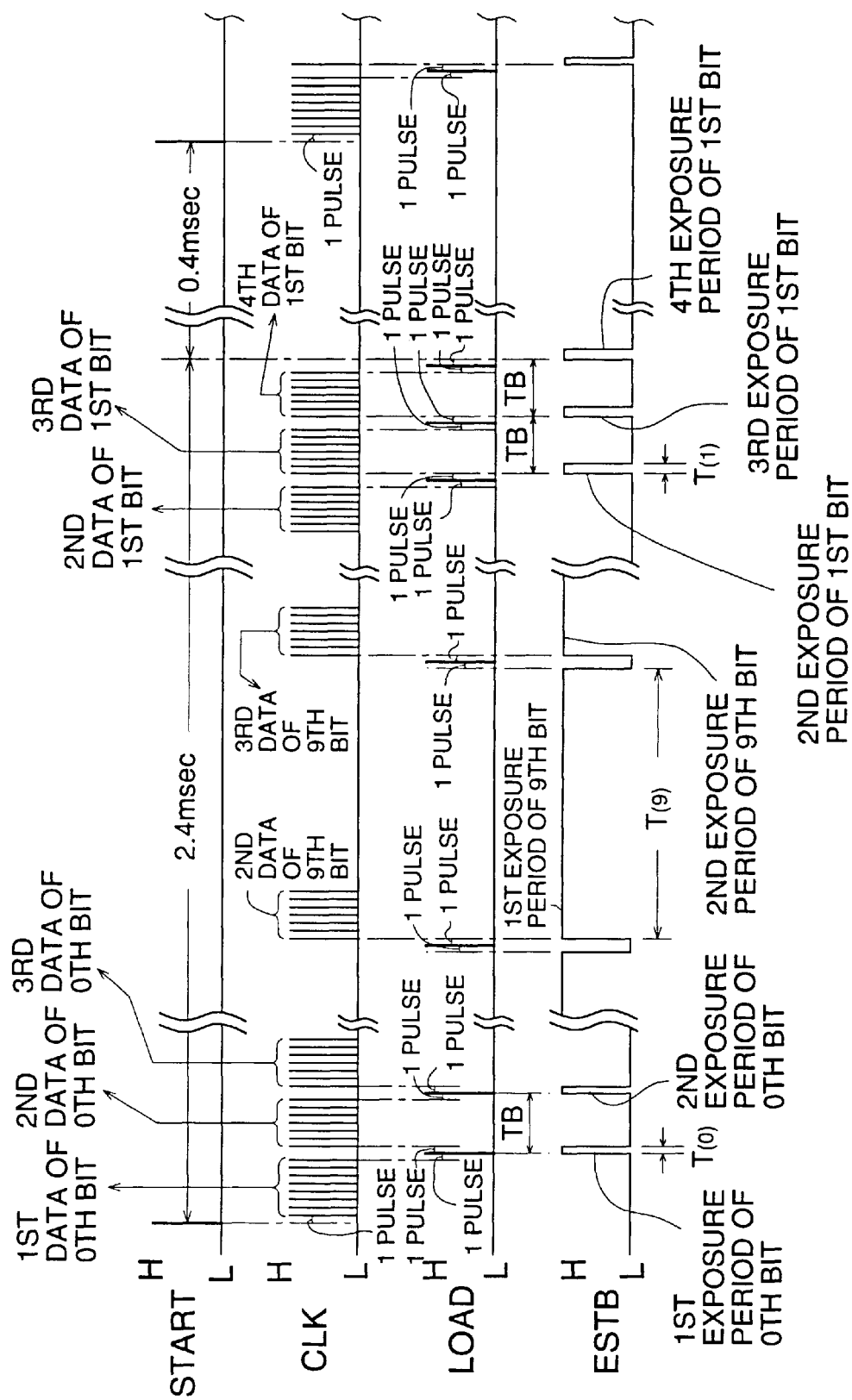
FIG. 8 is a timing chart of signals from a signal processing section of an image recording apparatus of example 1.

Further, the signal generation control section 16 generates each signal as shown in FIG. 8 which is a timing chart showing a portion of generation timing of each signal of the signal generation control section 16 of the signal control circuit for blue light and green light.

When the START signal, generated every time when the predetermined amount of printing paper 2 is conveyed, is inputted, the signal generation control section 16 initially causes the CLK signal to generate pulses whose number is equal to the number of pixels of the light emitting section, used for effective image recording, according to the oscillation pulses of the oscillator 17, and sends the $1^{st}$ serial image data of the $0^{th}$ bit to shift registers 111–118. When the CLK signal has completed generation of pulses whose number is equal to the number of pixels of the light emitting section used for effective image recording, the CLK signal becomes the status of L, a preparatory stage is finished, and the pulse of the oscillator 17 is counted by 1.

Next, the following one unit signal generating operation corresponding to each bit is repeated by 4 times for each bit stage in the order of the $0^{th}$ bit, the $2^{nd}$ bit, the $4^{th}$ bit, the $6^{th}$ bit, the $8^{th}$ bit, the $9^{th}$ bit, the $7^{th}$ bit, the $5^{th}$ bit, the $3^{rd}$ bit, the $1^{st}$ bit. That is, the latch control signal LOAD is made to generate one H pulse, and then, the latch control signal LOAD is made to be the status L. Then, when the pulse of the oscillator 17 is counted by 1, the output control signals ESTBR and ESTBL are made to be the status H, and simultaneously, the CLK signal is caused to generate the pulses whose number is equal to the number of pixels of the light emitting section used for effective image recording, and the signal generation control section 16 starts to send the 1 bit serial image data being optimum for output data and corresponding to the concerned bit to shift registers 111–118. Then, output control signals ESTBR, and ESTBL are made to be the status H, and after the exposure period corresponding to the concerned bit has passed, the output control signals ESTBR and ESTBL are made to be the status L. Then, when the CLK signal has completed generation of the pulses whose number is equal to the number of pixels of the light emitting section used for effective image recording, the CLK signal becomes the status L. Further, after the latch control signal LOAD is caused to generate 1 H pulse and the pulse of the oscillator 17 is counted by 1, the longer period of time between a predetermined interval time TB and the exposure period corresponding to the concerned bit is measured. After that period of time has passed, the pulse of the oscillator 17 is counted by 1, and the latch control signal LOAD is caused to generate 1 H pulse. The above-described operations are 1 unit of signal generating operation, and the 1 unit of signal generating operation is repeated 4 times for each bit stage.

In this connection, in the following 1 unit of signal generating operation corresponding to each bit, detection of the exposure period corresponding to the concerned bit, and detection of the longer period of time between the exposure period corresponding to the concerned bit and a predetermined interval time TB, are conducted by counting the oscillation pulses of the oscillator 17, whose number is corresponding to the length TS(n) of the exposure period corresponding to each bit stage and the predetermined interval time TB, according to the length TS(n) of the exposure period allotted to each of bits from the $9^{th}$ bit to the $0^{th}$ bit, and the predetermined interval time TB, which are recorded in the signal generation control section 16.

Then, at the time TP when the interval time TB in the $4^{th}$ time of the $1^{st}$ bit has passed, all signals are made to be the status of L, and image recording of 1 line of the effective image recording is completed. The time elapsed up to that time is about 2.4 msec, and when about 0.4 msec has passed after that, the next START signal is inputted, and the signal generation control section 16 starts recording of the next line.

Figure 7:
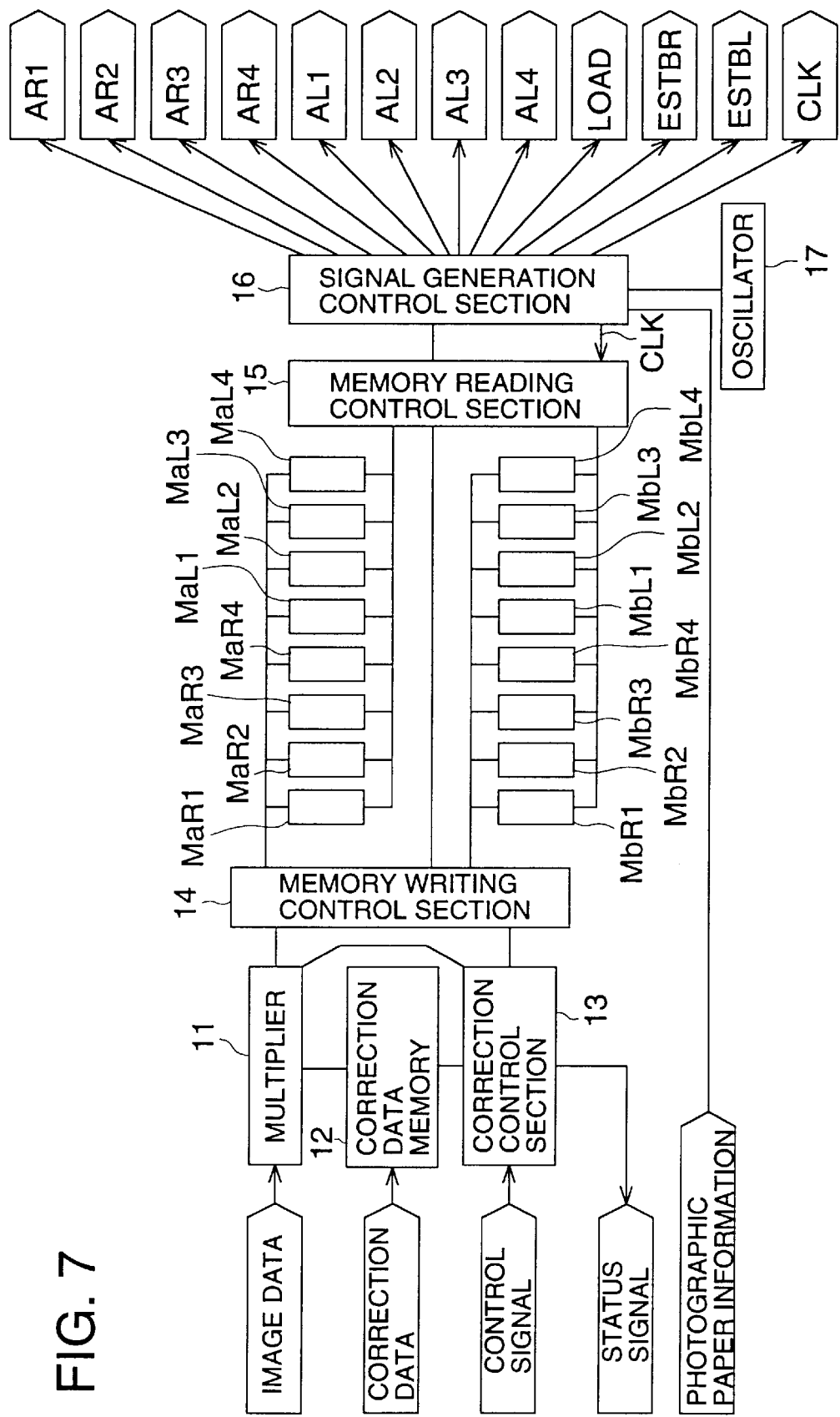
FIG. 7 is a block diagram of a signal processing section of an image recording apparatus of example 1.

Then, as shown in FIG. 7, after the serial image data has been set in shift registers 111 to 118, the next serial image data is set in the shift registers 111 to 118 while gates 121 and 122 complete the driving operation by the information in which the set serial image data has been latched.

Next, examples of the length TS(n) ($\mu$sec) of each exposure period will be shown.

The length ($\mu$sec) of the exposure period of the $9^{th}$ bit:
$TS(9)=512\times a+\alpha_9$
The length ($\mu$sec) of the exposure period of the $8^{th}$ bit:
$TS(8)=256\times a+\alpha_8$
The length ($\mu$sec) of the exposure period of the $7^{th}$ bit:
$TS(7)=128\times a+\alpha_7$
The length ($\mu$sec) of the exposure period of the $6^{th}$ bit:
$TS(6)=64\times a+\alpha_6$
The length ($\mu$sec) of the exposure period of the $5^{th}$ bit:
$TS(5)=32\times a+\alpha_5$
The length ($\mu$sec) of the exposure period of the $4^{th}$ bit:
$TS(4)=16\times a+\alpha_4$
The length ($\mu$sec) of the exposure period of the $3^{rd}$ bit:
$TS(3)=8\times a+\alpha_3$
The length ($\mu$sec) of the exposure period of the $2^{nd}$ bit:
$TS(2)=4\times a+\alpha_2$
The length ($\mu$sec) of the exposure period of the $1^{st}$ bit:
$TS(1)=2\times a+\alpha_1$
The length ($\mu$sec) of the exposure period of the $0^{th}$ bit:
$TS(0)=1\times a+\alpha_0$ In this connection, a is a factor determined by the recording head (VFPH), the resolution in the subsidiary scanning direction in image recording, the speed of relative movement of the recording head and photosensitive material, or the like, and in the present example, a factor of 0.15–2.0. Accordingly, these can be expressed by the following equation.

$$TS(n)=a\times 2^n+\alpha_n$$

The interval time TB is a period of time to send 1 bit serial image data to the shift registers 111–118 during a period of time between the latch control signal LOAD pulse and the next pulse, that is, a period of time to send 1 bit serial image data to the shift registers 111–118 is added by the margin time (for example, 0.1 $\mu$sec). Accordingly, the interval time TB is different depending on the number of pixels of the light emitting section used for effective image recording, and when all light emitting sections of the recording head are used for the effective image recording, (in the present example, the number of pixels are 320 for each shift register), the interval time TB is 16.1 $\mu$sec (320×0.05 $\mu$sec+0.1 $\mu$sec).

The contents of 1 bit serial image data AR1, AR2, AR3, AR4, AL1, AL2, AL3, and AL4, which are sent to shift registers 111–118 4 times for each bit stage from the $9^{th}$ bit to the $0^{th}$ bit, in the order of the $0^{th}$ bit, the $2^{nd}$ bit, the $4^{th}$ bit, the $6^{th}$ bit, the $8^{th}$ bit, the $9^{th}$ bit, the $7^{th}$ bit, the $5^{th}$ bit, the $3^{rd}$ bit, the $1^{st}$ bit will be explained according to FIG. 9 which is a portion of a serial image data transmission timing chart of the signal control circuit for blue light and green light.

Initially, the 1 bit serial image data AL1 and AR1 are generated using the timing (1)–(4) shown in the uppermost column in FIG. 9 as the reference as follows.

When the serial image data of the $11^{th}$ bit of each pixel stored in memories MaL1, MaR1 or memories MbL1, and MbR1 is "0" (light emission is OFF) and the serial image data of the $10^{th}$ bit is "0" (light emission is OFF), (that is, data of the concerned pixel is not less than 0 and not more than 1023), the data of the concerned bit stage stored in the memory at each bit stage from the $9^{th}$ bit to the $0^{th}$ bit is read at the timing (1), and data is set to "0" at other timing (2)–(4), thereby, data of the concerned pixel is produced.

When the serial image data of the $11^{th}$ bit of each pixel stored in memories MaL1, MaR1 or memories MbL1, and MbR1 is "0" (light emission is OFF) and the serial image data of the $10^{th}$ bit is "1" (light emission is ON), (that is, data of the concerned pixel is not less than 1024 and not more than 2047), data is set to "1" at timing (1), and the data of the concerned bit stage stored in the memory at each bit stage from the $9^{th}$ bit to the $0^{th}$ bit is read at the timing (2), and data is set to "0" at other timing (3) and (4), thereby, data of the concerned pixel is produced.

When the serial image data of the $11^{th}$ bit of each pixel stored in memories MaL1, MaR1 or memories MbL1, and MbR1 is "1" (light emission is ON) and the serial image data of the $10^{th}$ bit is "0" (light emission is OFF), (that is, data of the concerned pixel is not less than 2048 and not more than 3071), data is set to "1" at timing (1) and (2), and the data of the concerned bit stage stored in the memory at each bit stage from the $9^{th}$ bit to the $0^{th}$ bit is read at the timing (3), and data is set to "0" at other timing (4), thereby, data of the concerned pixel is produced.

When the serial image data of the $11^{th}$ bit of each pixel stored in memories MaL1, MaR1 or memories MbL1, and MbR1 is "1" (light emission is ON) and the serial image data of the $10^{th}$ bit is "1" (light emission is ON), (that is, data of the concerned pixel is not less than 3072 and not more than 4095), data is set to "1" at timing (1)–(3), and the data of the concerned bit stage stored in the memory at each bit stage from the $9^{th}$ bit to the $0^{th}$ bit is read at the timing (4), thereby, data of the concerned pixel is produced.

Figure 9:
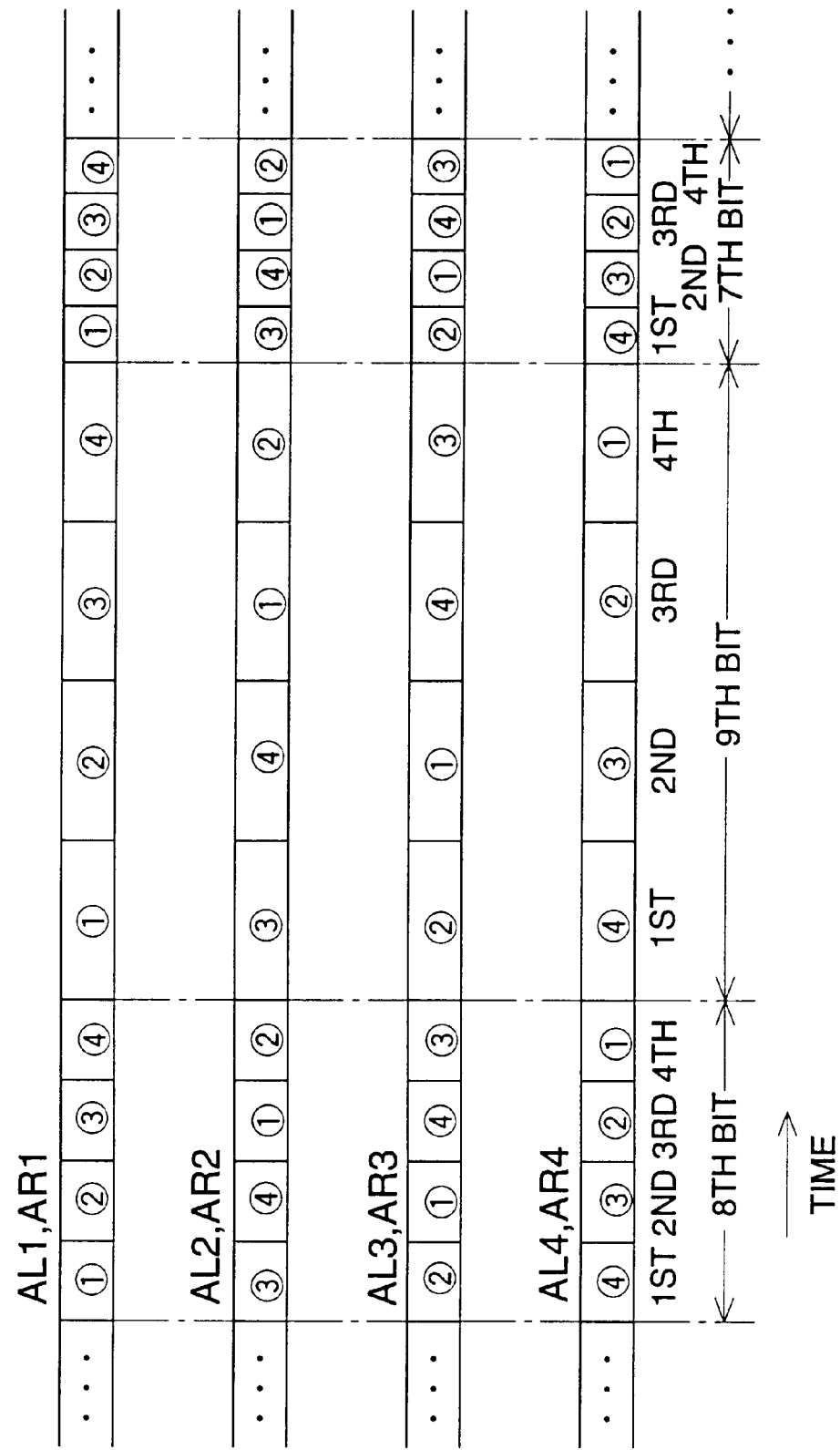
FIG. 9 is a part of a timing chart for blue light and green light serial image data transmission in example 1.

Further, the 1 bit serial image data AL2 and AR2 are generated using timing (1)–(4) shown in the second uppermost column in FIG. 9 as the reference from data of each pixel stored in memories MaL2, MaR2 or MbL2, MbR2 in the same manner as the above-description. The 1 bit serial image data AL3 and AR3 are generated using timing (1)–(4) shown in the third uppermost column in FIG. 9 as the reference from data of each pixel stored in memories MaL3, MaR3 or MbL3, MbR3 in the same manner as the above-description. The 1 bit serial image data AL4 and AR4 are generated using timing (1)–(4) shown in the fourth uppermost column in FIG. 9 as the reference from data of each pixel stored in memories MaL4, MaR4 or MbL4, MbR4 in the same manner as the above-description.

According to that, adjoining light emitting sections are simultaneously emitted only when data of the highest rank bit of at least one of light emitting section of the adjoining light emitting sections is "1" (light emission is ON). Further, relating to each light emitting section, when the $11^{th}$ bit, which is the highest rank bit, and the $10^{th}$ bit, which is the second highest rank bit, are "0" (light emission is OFF) in all of the light emitting sections adjoining the concerned light emitting section and the next adjoining sections, only the concerned light emitting section simultaneously emits the light in all of bits from the $9^{th}$ bit to the lowest rank bit. Therefore, influence of shift of an amount of light emission caused when adjoining pixels simultaneously emit light, can be effectively prevented.

Figure 10:
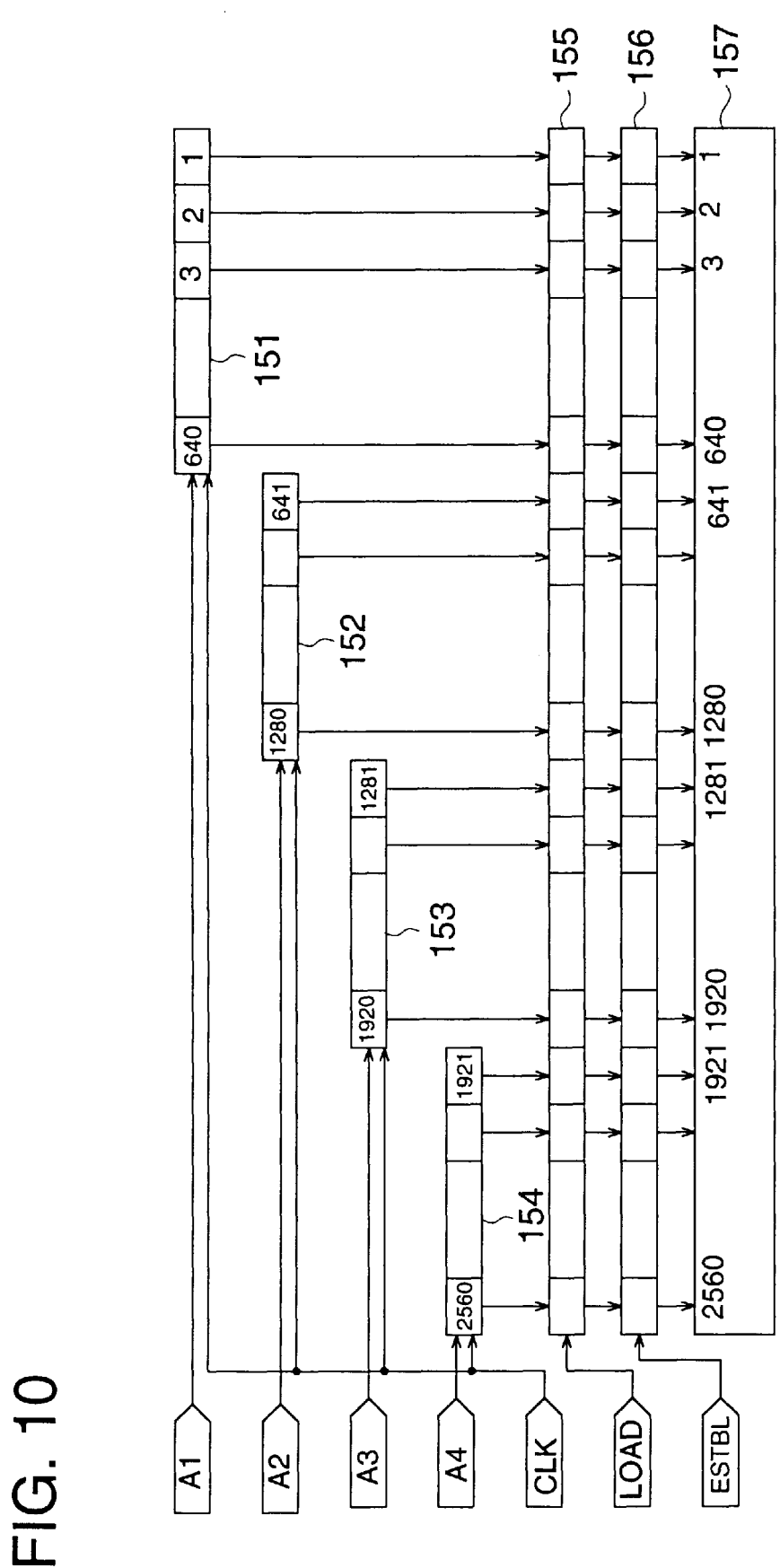
FIG. 10 is a circuit diagram of a red light recording head in example 1.

Next, a circuit inside the red light-use recording head 41 will be explained according to FIG. 10 which is a circuit diagram of the circuit inside the recording head 41. Inside the recording head 41, shift registers 151–154, a latch circuit 155, a gate 156, and a recording head 157. The signal receiving section of the recording head 41 receives the 1 bit serial image data A1, A2, A3, A4, latch control signal LOAD, output control signal ESTB, and clock signal CLK for data shift from a red light-use signal processing circuit of the signal processing section 10, and supplies these signals to each section as shown in FIG. 10.

Then, the shift register 151 sets 1 bit serial image data A1, the shift register 152 sets 1 bit serial image data A2, the shift register 153 sets 1 bit serial image data A3, the shift register 154 sets 1 bit serial image data A4, in timed relationship with the clock CLK for data shift.

The latch circuit 155 latches the 1 bit serial image data A1–A4 which are set in the shift registers 151–154 according to the latch control signal LOAD. The gate 156 generates 1 bit driving signal of L or H from the output control signal ESTB in accordance with paper information, according to the 1 bit serial image data latched by the latch circuit 155, and sends it to the recording head 157. The recording head 157 drives each light emitting section by the driving signal generated by the gate 156.

In this connection, the output control signal ESTB is a signal of H or L. The gate 156 is driven by the 1 bit serial image data when the output control signal ESTB is H, and the driving signal of all L is generated when the output control signal ESTB is L. ESTB selects the optimum time for the paper registered in advance on a signal generation control section.

Figure 11:
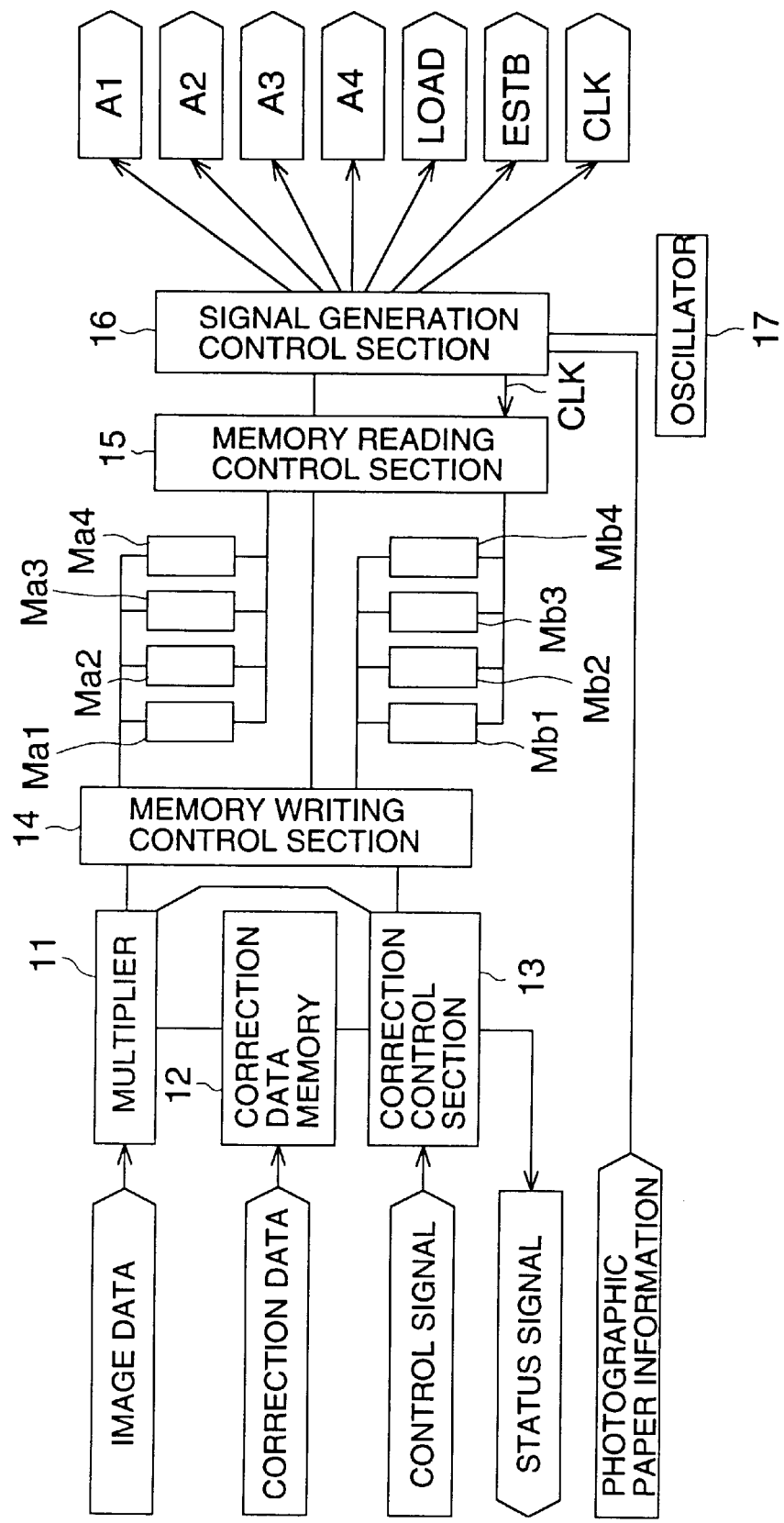
FIG. 11 is a schematic block diagram of a red light signal processing circuit in example 1.

Next, the red light-use signal processing circuit of the signal processing section which generates the 1 bit serial image data A1, A2, A3, A4, latch control signal LOAD, output control signal ESTB, and clock signal CLK for data shift which are sent to the red light-use recording head 41, from the inputted image data, will be explained according to FIG. 11 which is an outline block diagram of the red light-use signal processing circuit of the signal processing section 10.

The signal processing circuit has a multiplier 11 which multiplies correction data by image data sent from the image processing control circuit 1 so that the unevenness of light emission characteristics of each light emitting section of the recording head is corrected; a correction data memory 12 which stores the correction data sent from the image processing control circuit 1, and supplies it to the multiplier 11; a correction control section 13 which receives the control signal from the image processing control circuit 1 and the status signal of a memory writing control section 14, controls the multiplier 11 and the correction data memory 12 corresponding to the control signal and the status signal, and sends the status signal to the image processing control circuit; a memory writing control section 14 which allots the image data corrected by the multiplier 11 to memories corresponding to each shift register of the recording head, and writes the data; a memory group (Ma1, Ma2, Ma3, Ma4, Mb1, Mb2, Mb3, Mb4) which is provided corresponding to shift registers 151–154 of the recording head; a memory reading control section 15 to read 1 bit serial image data for each bit from each memory according to the clock signal CLK for data shift sent from the signal generating control section 16; an oscillator 17 to oscillates a pulse having a predetermined frequency (for example, 20 MHz, that is, a period is 0.05 $\mu$sec); and a signal generation control section 16 which, according to the oscillation pulse from the oscillator 17, generates the latch control signal LOAD and sends it to the latch circuit 155, generates the output control signal ESTB and sends it to the gate 156, generates the clock signal CLK for data shift and sends it registers 152–154, and sends the 1 bit serial image data A1, A2, A3, A4 corresponding to shift registers 151–154, which are read by the memory reading control section 15, to respectively corresponding shift registers 151–154.

Then, the image data sent from the image processing control circuit 1 is multiplied by the correction data in the multiplier 11 and corrected. The corrected image data is allotted by the memory writing control section 14 to the memory corresponding to each shift register of the recording head and written.

The memory writing control section 14, memory group, and memory reading control section 15 are used for generating 1 bit serial image data for each bit stage as follows: the memory reading control section 15 controls the address of the memory group from which data is read, thereby, 12 bit multi-contrast image data is read for each bit stage in the order of the $0^{th}$ bit, the $2^{nd}$ bit, the $4^{th}$ bit, the $6^{th}$ bit, the $8^{th}$ bit, the $10^{th}$ bit, the $11^{th}$ bit, the $9^{th}$ bit, the $7^{th}$ bit, the $5^{th}$ bit, the $3^{rd}$ bit and the $1^{st}$ bit, and the 1 bit serial image data for each bit stage is generated.

The 12 bit multi-contrast image data is the image data in which gradation is expressed by 12 bits from the $11^{th}$ bit to the $0^{th}$ bit in the binary system. The $11^{th}$ bit which is the highest rank bit, is the largest digit, and the $0^{th}$ bit which is the lowest rank bit, is the smallest digit. To read the 12 bit multi-contrast image data for each bit stage, means to read a value of 1/0 of each digit of the 12 bit multi-contrast image data in the binary system by 1 digit at a time.

The memory group has memories for each of shift registers 151–154, and therefore, by controlling the address of the memory from which data is read, by the memory reading control section 15, 12 bit multi-contrast image data stored in each memory is read for each bit stage in the order of the $0^{th}$ bit, the $2^{nd}$ bit, the $4^{th}$ bit, the $6^{th}$ bit, the $8^{th}$ bit, the $10^{th}$ bit, the $11^{th}$ bit, the $9^{th}$ bit, the $7^{th}$ bit, the $5^{th}$ bit, the $3^{rd}$ bit, and the $1^{st}$ bit, and the 1 bit serial image data A1, A2, A3, A4 for each bit stage are generated.

The memory group is divided into 2 systems of the memory system a composed of Ma1, Ma2, Ma3, Ma4 and the memory system b composed of Mb1, Mb2, Mb3, Mb4. The status in which, simultaneously when the memory writing control section 14 writes data in the memory system a, the memory reading control section 15 reads data from the memory system b, and the status in which, simultaneously when the memory writing control section 14 writes data in the memory system b, the memory reading control section 15 reads data from the memory system a, are alternately repeated. For this operation, the writing end signal showing that data writing into the memory has been completed, is sent from the memory writing control section 14 to the memory reading control section 15, and the memory reading control section 15 starts reading of the another memory system after reception of the writing end signal. Further, the reading end signal showing that data reading from the memory has been completed, is sent from the memory reading control section 15 to the memory writing control section 14, and the memory writing control section 14 starts writing into another memory system after reception of the reading end signal. According to this operation, timing of image data writing of the memory writing control section 14 and timing of image data reading of the memory reading control section 15 can be independent of each other.

Then, the memory writing control section 14 generates the status signal showing the status that writing into the memory has been completed and the reading end signal from the memory reading control section 15 is received, that is, the status signal showing whether the next image data can be written or not, and sends the signal to the correction control section 13. Then, the correction control section 13 generates the status signal showing that the memory writing control section 14 can write the next image data, and the multiplier 11 and the correction data memory 12 are on good condition, that is, the status signal showing whether the next image data can be received or not, and sends the signal to the image processing control circuit 1.

Figure 12:
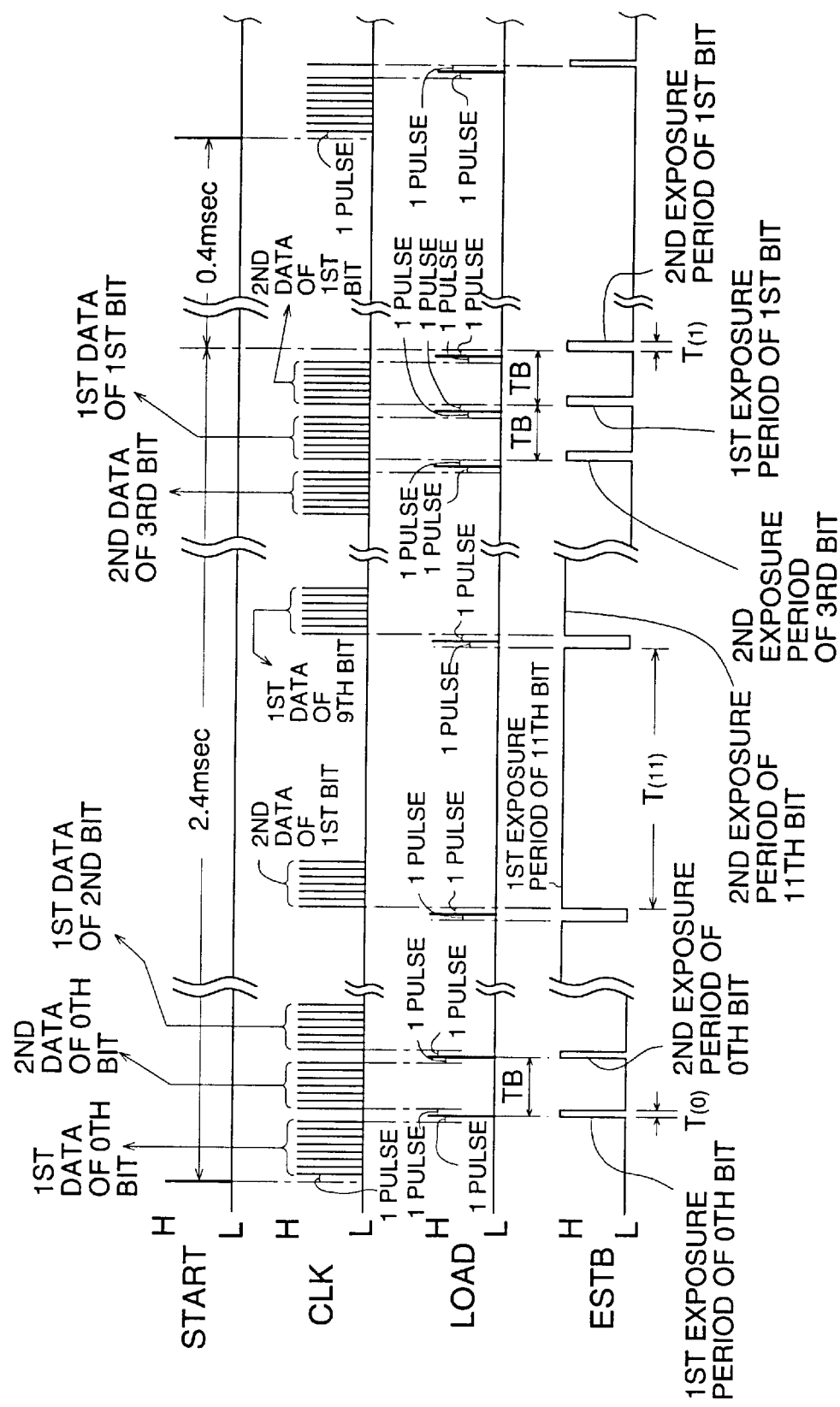
FIG. 12 is a timing chart showing a part of each signal generating timing of signal generation control section 16 of a red light signal control circuit in example 1.

The signal generation control section 16 generates each signal as shown in FIG. 12 which is a timing chart showing a portion of generation timing of each signal of the signal generation control section 16 of the red light-use signal control circuit.

When the START signal which is generated every time when a predetermined amount of the printing paper 2 is conveyed, is inputted into the signal generation control section 16, initially, the CLK signal generates pulses whose number is equal to the number of pixels of the light emitting section used for effective image recording, according to the oscillation pulse of the oscillator 17, and the $1^{st}$ serial image data of the $0^{th}$ bit is sent to shift registers 151–154. When the CLk signal has completed generation of pulses whose number is equal to the number of pixels of the light emitting section used for effective image recording, the CLk signal becomes the status of L, the pulses of the oscillator 17 is counted by 1, and the sequence advances to the next step.

Next, the following 1 unit of signal generating operation is repeated twice corresponding to each bit for each bit stage in the order of the $0^{th}$ bit, the $2^{nd}$ bit, the $4^{th}$ bit, the $6^{th}$ bit, the $8^{th}$ bit, the $10^{th}$ bit, the $11^{th}$ bit, the $9^{th}$ bit, the $5^{th}$ bit, the $3^{rd}$ bit, the $1^{st}$ bit. That is, the latch control signal LOAD is caused to generate 1 H pulse, and is made to be the status of L. Then, the signal generation control section 16 counts the pulse of the oscillator 17 by 1 pulse, makes the output control signal ESTB in the status of H, makes the CLk signal generate pulses whose number is equal to the number of pixels of the light emitting section used for effective image recording, and starts to send the 1 bit serial image data being optimum for output data and corresponding to the concerned bit to shift registers 151–154. Then, when the exposure period corresponding to the concerned bit has passed after the output control signal ESTB was made in the status of H, the output control signal ESTB is made in the status of L. When the CLk signal has completed the generation of pulses whose number is equal to the number of pixels of the light emitting section used for effective image recording, the CLK signal becomes the status of L. When the pulse of the oscillator 17 is counted by 1 after the longer period of time between a predetermined interval time TB and the exposure period corresponding to the concerned bit has passed from the time when the latch control signal LOAD has generated 1 H pulse and the pulse of the oscillator 17 is counted by 1, the latch control signal LOAD is caused to generate 1 H pulse. The above-described operation is 1 unit of the signal generating operation.

In this connection, the detection of the exposure period corresponding to the concerned bit in the 1 unit of signal generating operation which is conducted each twice corresponding to each bit for each bit stage, and the detection of the longer period of time between the exposure period corresponding to the concerned bit and the predetermined interval time TB, are conducted by counting the oscillation pulses of the oscillator 17 whose number is corresponding to the length TS(n) of the exposure period corresponding to each bit stage and the predetermined interval time TB, according to the length TS(n) of the exposure time allotted to each bit from the $11^{th}$ bit to the $0^{th}$ bit which is recorded in the signal generation control section 16, and the predetermined interval time TB.

Then, when the $2^{nd}$ time output control signal ESTB of the $1^{st}$ bit is made in the status of L, 1 line image recording of the effective image recording has been completed.

Next, the length TS(n) ($\mu$sec) of each exposure period will be shown.

The length ($\mu$sec) of the exposure period of the $11^{th}$ bit:
$TS(11)=2048\times a+\alpha_{11}$
The length ($\mu$sec) of the exposure period of the $10^{th}$ bit:
$TS(10)=1024\times a+\alpha_{10}$
The length ($\mu$sec) of the exposure period of the $9^{th}$ bit:
$TS(9)=514\times a+\alpha_9$
The length ($\mu$sec) of the exposure period of the $8^{th}$ bit:
$TS(8)=258\times a+\alpha_8$
The length ($\mu$sec) of the exposure period of the $7^{th}$ bit:
$TS(7)=130\times a+\alpha_7$
The length ($\mu$sec) of the exposure period of the $6^{th}$ bit:
$TS(6)=66\times a+\alpha_6$
The length ($\mu$sec) of the exposure period of the $5^{th}$ bit:
$TS(5)=34\times a+\alpha_5$
The length ($\mu$sec) of the exposure period of the $4^{th}$ bit:
$TS(4)=18\times a+\alpha_4$
The length ($\mu$sec) of the exposure period of the $3^{rd}$ bit:
$TS(3)=10\times a+\alpha_3$
The length ($\mu$sec) of the exposure period of the $2^{nd}$ bit:
$TS(2)=6\times a+\alpha_2$
The length ($\mu$sec) of the exposure period of the $1^{st}$ bit:
$TS(1)=4\times a+\alpha_1$
The length ($\mu$sec) of the exposure period of the $0^{th}$ bit:
$TS(0)=3\times a+\alpha_0$ In this connection, a is a factor determined by the recording head (LED array), the resolution in the subsidiary scanning direction in image recording, the speed of relative movement of the recording head and photosensitive material, or the like, and in the present example, a factor of 0.01–0.5.

When this is expressed by $TS(n)=a\times 2^n+\alpha_n\beta(n)$, $\beta(11)=\beta(10)=0$ $\beta(9)=\beta(8)=\beta(7)=\beta(6)=\beta(5)=\beta(4)=\beta(3)=\beta(2)=\beta(1)=\beta(0)=2\times a$ The interval time TB is a period of time to send 1 bit serial image data to the shift registers 151–154 during a period of time between the latch control signal LOAD pulse and the next pulse, that is, a period of time to send 1 bit serial image data to the shift registers 151–154 is added by the margin time (for example, 0.1 $\mu$sec).

Next, the contents of 1 bit serial image data A1, A2, A3, A4 which are sent to shift registers 151–154 twice for each bit stage from the $11^{th}$ bit to the $0^{th}$ bit, in the order of the $0^{th}$ bit, the $2^{nd}$ bit, the $4^{th}$ bit, the $6^{th}$ bit, the $8^{th}$ bit, the $10^{th}$ bit, the $11^{th}$ bit, the $9^{th}$ bit, the $7^{th}$ bit, the $5^{th}$ bit, the $3^{rd}$ bit, the $1^{st}$ bit will be explained. Initially, the 1 bit serial image data A1, a2, A3, A4 at the first timing, is generated as follows: data of a number (1, 3, 5, . . . 2557, 2559) in which, when a number of the light emitting section is divided by 2, the surplus is 1, is read from the memory, and all data of the other number (2, 4, 6, . . . 2558, 2560) is set to "0" (light emission is OFF). The 1 bit serial image data A1, A2, A3, A4 at the next timing, is generated as follows: data of a number (2, 4, 6, . . . 2558, 2560) in which, when a number of the light emitting section is divided by 2, the surplus is 0, is read from the memory, and all data of the other number (1, 3, 5, . . . 2557, 2559) is set to "0" (light emission is OFF).

Thereby, because adjoining light emitting sections do not emit light, the influence of variation of the exposure amount depending on whether the adjoining light emitting sections conduct exposure or not, can be effectively prevented.

EXAMPLE 2

The present example is a modified example of Example 1. All of differences between the present example and Example 1 will be explained below.

The contents of 1 bit serial image data AR1, AR2, AR3, AR4, AL1, AL2, AL3, and AL4, which are sent to shift registers 111–118 4 times for each bit stage from the $9^{th}$ bit to the $0^{th}$ bit, are different from Example 1 as follows. These will be explained according to FIG. 18 which is a portion of a serial image data transmission timing chart of the signal control circuit for blue light and green light.

Initially, the 1 bit serial image data AL1 and AR1 are generated using the timing (1)–(4) shown in the uppermost column in FIG. 18 as the reference as follows.

When the serial image data of the $11^{th}$ bit of each pixel stored in memories MaL1, MaR1 or memories MbL1, and MbR1 is "0" (light emission is OFF) and the serial image data of the $10^{th}$ bit is "0" (light emission is OFF), (that is, data of the concerned pixel is not less than 0 and not more than 1023), the data of the concerned bit stage stored in the memory at each bit stage from the $9^{th}$ bit to the $0^{th}$ bit is read at the timing(1), and data is set to "0" at other timing (2)–(4), thereby, data of the concerned pixel is produced.

When the serial image data of the $11^{th}$ bit of each pixel stored in memories MaL1, MaR1 or memories MbL1, and MbR1 is "0" (light emission is OFF) and the serial image data of the $10^{th}$ bit is "1" (light emission is ON), (that is, data of the concerned pixel is not less than 1024 and not more than 2047), data is set to "1" at timing (1), and the data of the concerned bit stage stored in the memory at each bit stage from the $9^{th}$ bit to the $0^{th}$ bit is read at the timing(2), and data is set to "0" at other timing (3) and(4), thereby, data of the concerned pixel is produced.

When the serial image data of the $11^{th}$ bit of each pixel stored in memories MaL1, MaR1 or memories MbL1, and MbR1 is "1" (light emission is ON) and the serial image data of the $10^{th}$ bit is "0" (light emission is OFF), (that is, data of the concerned pixel is not less than 2048 and not more than 3071), data is set to "1" at timing (1)and (2), and the data of the concerned bit stage stored in the memory at each bit stage from the $9^{th}$ bit to the $0^{th}$ bit is read at the timing(3), and data is set to "0" at other timing (4), thereby, data of the concerned pixel is produced.

When the serial image data of the $11^{th}$ bit of each pixel stored in memories MaL1, MaR1 or memories MbL1, and MbR1 is "1" (light emission is ON) and the serial image data of the $10^{th}$ bit is "1" (light emission is ON), (that is, data of the concerned pixel is not less than 3072 and not more than 4095), data is set to "1" at timing (1)–(3), and the data of the concerned bit stage stored in the memory at each bit stage from the $9^{th}$ bit to the $0^{th}$ bit is read at the timing(4), thereby, data of the concerned pixel is produced.

Figure 18:
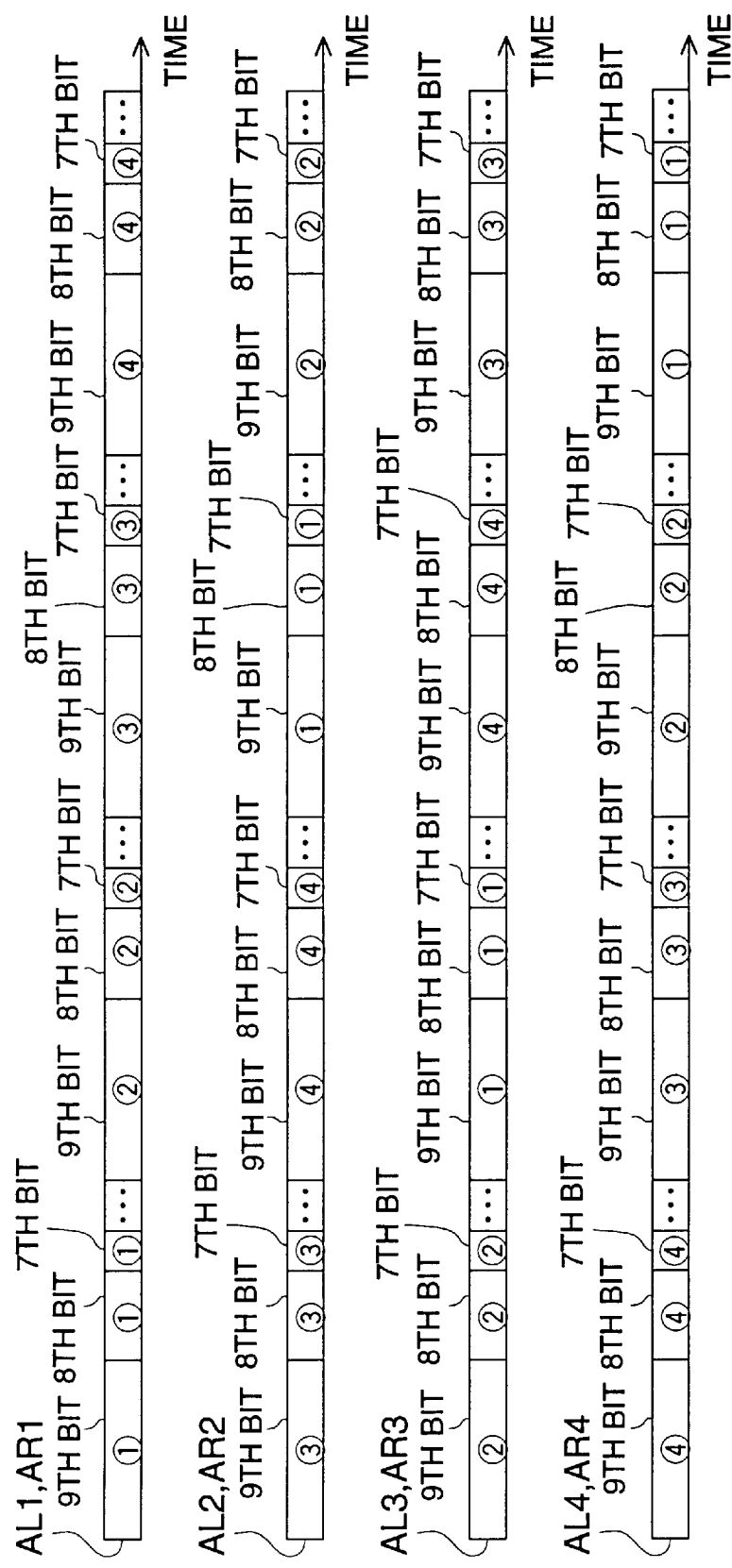
FIG. 18 is a serial image data transmission timing chart of the signal control circuit for blue light and green light in modified example 2.

Further, the 1 bit serial image data AL2 and AR2 are generated using timing (1)–(4) shown in the second uppermost column in FIG. 18 as the reference, from data of each pixel stored in memories MaL2, MaR2 or MbL2, MbR2 in the same manner as the above-description. The 1 bit serial image data AL3 and AR3 are generated using timing (1)–(4) shown in the third uppermost column in FIG. 18 as the reference, from data of each pixel stored in memories MaL3, MaR3 or MbL3, MbR3 in the same manner as the above-description. The 1 bit serial image data AL4 and AR4 are generated using timing (1)–(4) shown in the fourth uppermost column in FIG. 18 as the reference, from data of each pixel stored in memories MaL4, MaR4 or memories MbL4, MbR4 in the same manner as the above-description.

In order to control as described above, in each blue light and green light-use signal generating circuit, the signal generation control section 16 repeats it 4 times to conduct the signal generating operation in the order from the $9^{th}$ bit to the $0^{th}$ bit by 1 unit.

In the present example, the content of 1 bit serial image data A1, a2, A3, A4 sent to shift registers 151–154 twice for each bit stage from the $11^{th}$ bit to the $0^{th}$ bit of the red light-use signal control circuit, is different from that of Example 1 as follows.

The content of 1 bit serial image data A1, a2, A3, A4 sent to shift registers 151–154 in the order from the $11^{th}$ bit to the $0^{th}$ bit, twice for each bit stage from the $11^{th}$ bit to the $0^{th}$ bit of the red light-use signal control circuit, will be described below. Initially, A1, a2, A3 and A4 are generated as follows: 1 bit serial image data from the $11^{th}$ bit to the $0^{th}$ bit of a number (1, 3, 5, . . . 2557, 2559) in which, when a number of the light emitting section is divided by 2, the surplus is 1, is read from the memory, and all data of the other number (2, 4, 6, . . . 2558, 2560) is set to "0" (light emission is OFF). Next, A1, A2, A3, and A4 are generated as follows: 1 bit serial image data from the $11^{th}$ bit to the $0^{th}$ bit of a number (2, 4, 6, . . . 2558, 2560) in which, when a number of the light emitting section is divided by 2, the surplus is 0, is read from the memory, and all data of the other number (1, 3, 5, . . . 2557, 2559) is set to "0" (light emission is OFF).

In order to control as described above, in the red light-use signal generating circuit, the signal generation control section 16 repeats it twice to conduct the signal generating operation in the order from the $11^{th}$ bit to the $0^{th}$ bit by 1 unit.

EXAMPLE 3

The present example is a modified example of Example 1. All of differences between the present example and Example 1 will be explained below.

The contents of 1 bit serial image data AR1, AR2, AR3, AR4, AL1, AL2, AL3, and AL4, which are sent to shift registers 111–118 4 times for each bit stage from the $9^{th}$ bit to the $0^{th}$ bit, are different from Example 1 as follows. These will be explained according to FIG. 19 which is a portion of a serial image data transmission timing chart of the signal control circuit for blue light and green light.

Initially, the 1 bit serial image data AL1 and AR1 are generated using the timing (1)–(4) shown in the uppermost column in FIG. 19 as the reference as follows.

When the serial image data of the $11^{th}$ bit of each pixel stored in memories MaL1, MaR1 or memories MbL1, and MbR1 is "0" (light emission is OFF) and the serial image data of the $10^{th}$ bit is "0" (light emission is OFF), (that is, data of the concerned pixel is not less than 0 and not more than 1023), the data of the concerned bit stage stored in the memory at each bit stage from the $9^{th}$ bit to the $0^{th}$ bit is read at the timing(1), and data is set to "0" at other timing (2)–(4), thereby, data of the concerned pixel is produced.

When the serial image data of the $11^{th}$ bit of each pixel stored in memories MaL1, MaR1 or memories MbL1, and MbR1 is "0" (light emission is OFF) and the serial image data of the $10^{th}$ bit is "1" (light emission is ON), (that is, data of the concerned pixel is not less than 1024 and not more than 2047), data is set to "1" at timing (1), and the data of the concerned bit stage stored in the memory at each bit stage from the $9^{th}$ bit to the $0^{th}$ bit is read at the timing(2), and data is set to "0" at other timing (3) and(4), thereby, data of the concerned pixel is produced.

When the serial image data of the $11^{th}$ bit of each pixel stored in memories MaL1, MaR1 or memories MbL1, and MbR1 is "1" (light emission is ON) and the serial image data of the $10^{th}$ bit is "0" (light emission is OFF), (that is, data of the concerned pixel is not less than 2048 and not more than 3071), data is set to "1" at timing (1)and (2), and the data of the concerned bit stage stored in the memory at each bit stage from the $9^{th}$ bit to the $0^{th}$ bit is read at the timing(3), and data is set to "0" at timing (4), thereby, data of the concerned pixel is produced.

When the serial image data of the $11^{th}$ bit of each pixel stored in memories MaL1, MaR1 or memories MbL1, and MbR1 is "1" (light emission is ON) and the serial image data of the $10^{th}$ bit is "1" (light emission is ON), (that is, data of the concerned pixel is not less than 3072 and not more than 4095), data is set to "1" at timing (1)–(3), and the data of the concerned bit stage stored in the memory at each bit stage from the $9^{th}$ bit to the $0^{th}$ bit is read at the timing(4), thereby, data of the concerned pixel is produced.

Figure 19:
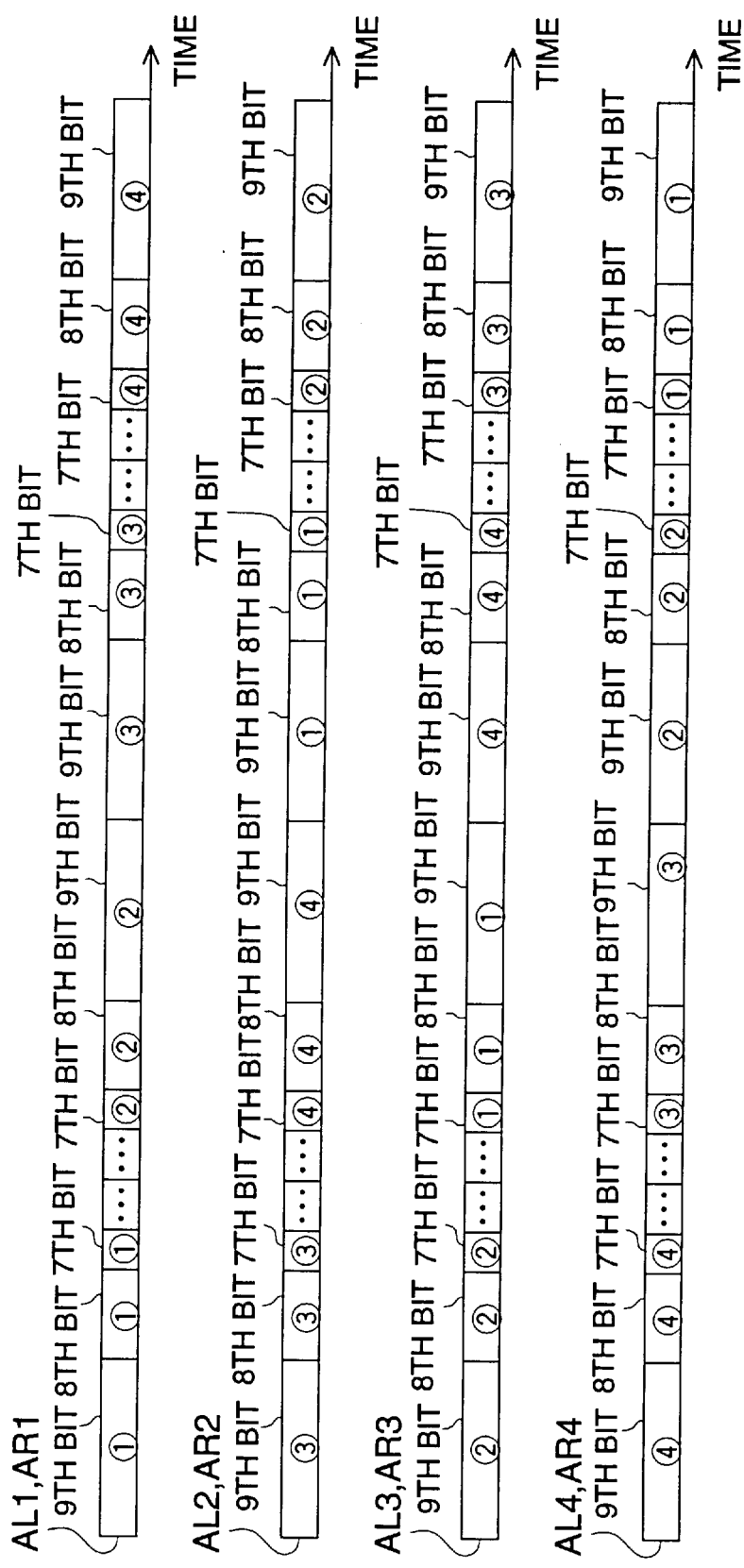
FIG. 19 is a serial image data transmission timing chart of the signal control circuit for blue light and green light in modified example 3.

Further, the 1 bit serial image data AL2 and AR2 are generated using timing (1)–(4) shown in the second uppermost column in FIG. 19 as the reference, from data of each pixel stored in memories MaL2, MaR2 or memories MbL2, MbR2 in the same manner as the above-description. The 1 bit serial image data AL3 and AR3 are generated using timing (1)–(4) shown in the third uppermost column in FIG. 19 as the reference, from data of each pixel stored in memories MaL3, MaR3 or memories MbL3, MbR3 in the same manner as the above-description. The 1 bit serial image data AL4 and AR4 are generated using timing (1)–(4) shown in the fourth uppermost column in FIG. 19 as the reference, from data of each pixel stored in memories MaL4, MaR4 or memories MbL4, MbR4 in the same manner as the above-description.

In order to control as described above, in the blue light-use and green light-use signal generating circuits, the signal generation control section 16 conducts the signal generating operation in the order from the $9^{th}$ bit to the $0^{th}$ bit by 1 unit. Next, the signal generation control section 16 conducts the signal generating operation in the order from the $0^{th}$ bit to the $9^{th}$ bit by 1 unit, and then conducts the signal generating operation in the order from the $9^{th}$ bit to the $0^{th}$ bit by 1 unit. Next, the signal generation control section 16 conducts the signal generating operation in the order from the $0^{th}$ bit to the $9^{th}$ bit by 1 unit.

In the present example, the content of 1 bit serial image data A1, a2, A3, A4 sent to shift registers 151–154 twice for each bit stage from the $11^{th}$ bit to the $0^{th}$ bit of the red light-use signal control circuit, is different from that of Example 1 as follows.

The content of 1 bit serial image data A1, a2, A3, A4 sent to shift registers 151–154 in the order from the $11^{th}$ bit to the $0^{th}$ bit, and next, sent to shift registers 151–154 in the order from the $0^{th}$ bit to the $11^{th}$ bit, for each bit stage from the $11^{th}$ bit to the $0^{th}$ bit of the red light-use signal control circuit, will be described below. Initially, A1, a2, A3 and A4 are generated as follows: 1 bit serial image data from the $11^{th}$ bit to the $0^{th}$ bit of a number (1, 3, 5, . . . 2557, 2559) in which, when a number of the light emitting section is divided by 2, the surplus is 1, is read from the memory, and all data of the other number (2, 4, 6, . . . 2558, 2560) is set to "0" (light emission is OFF). Next, A1, A2, A3, and A4 are generated as follows: 1 bit serial image data from the $0^{th}$ bit to the $11^{th}$ bit of a number (2, 4, 6, . . . 2558, 2560) in which, when a number of the light emitting section is divided by 2, the surplus is 0, is read from the memory, and all data of the other number (1, 3, 5, . . . 2557, 2559) is set to "0" (light emission is OFF).

In order to control as described above, in the red light-use signal generating circuit, the signal generation control section 16 conducts the signal generating operation in the order from the $11^{th}$ bit to the $0^{th}$ bit by 1 unit, and next, conducts the signal generating operation in the order from the $0^{th}$ bit to the $11^{th}$ bit by 1 unit.

EXAMPLE 4

The present example is a modified example of Example 3. All of differences between the present example and Example 3 will be explained below.

In the present example, only the contents of 1 bit serial image data AR1, AR2, AR3, AR4, AL1, AL2, AL3, and AL4, which are sent to shift registers 111–118 4 times for each bit stage from the $9^{th}$ bit to the $0^{th}$ bit, are different from Example 3 as follows. These will be explained according to FIG. 20 which is a portion of a serial image data transmission timing chart of the signal control circuit for blue light and green light.

Initially, the 1 bit serial image data AL1 and AR1 are generated using the timing (1)–(4) shown in the uppermost column in FIG. 20 as the reference as follows.

When the serial image data of the $11^{th}$ bit of each pixel stored in memories MaL1, MaR1 or memories MbL1, and MbR1 is "0" (light emission is OFF) and the serial image data of the $10^{th}$ bit is "0" (light emission is OFF), (that is, data of the concerned pixel is not less than 0 and not more than 1023), the data of the concerned bit stage stored in the memory at each bit stage from the $9^{th}$ bit to the $0^{th}$ bit is read at the timing(1), and data is set to "0" at other timing (2)–(4), thereby, data of the concerned pixel is produced.

When the serial image data of the $11^{th}$ bit of each pixel stored in memories MaL1, MaR1 or memories MbL1, and MbR1 is "0" (light emission is OFF) and the serial image data of the $10^{th}$ bit is "1" (light emission is ON), (that is, data of the concerned pixel is not less than 1024 and not more than 2047), data is set to "1" at timing (1), and the data of the concerned bit stage stored in the memory at each bit stage from the $9^{th}$ bit to the $0^{th}$ bit is read at the timing(2), and data is set to "0" at other timing (3) and(4), thereby, data of the concerned pixel is produced.

When the serial image data of the $11^{th}$ bit of each pixel stored in memories MaL1, MaR1 or memories MbL1, and MbR1 is "1" (light emission is ON) and the serial image data of the $10^{th}$ bit is "0" (light emission is OFF), (that is, data of the concerned pixel is not less than 2048 and not more than 3071), data is set to "1" at timing (1)and (2), and the data of the concerned bit stage stored in the memory at each bit stage from the $9^{th}$ bit to the $0^{th}$ bit is read at the timing(3), and data is set to "0" at timing (4), thereby, data of the concerned pixel is produced.

When the serial image data of the $11^{th}$ bit of each pixel stored in memories MaL1, MaR1 or memories MbL1, and MbR1 is "1" (light emission is ON) and the serial image data of the $10^{th}$ bit is "1" (light emission is ON), (that is, data of the concerned pixel is not less than 3072 and not more than 4095), data is set to "1" at timing (1)–(3), and the data of the concerned bit stage stored in the memory at each bit stage from the $9^{th}$ bit to the $0^{th}$ bit is read at the timing(4) thereby, data of the concerned pixel is produced.

Figure 20:
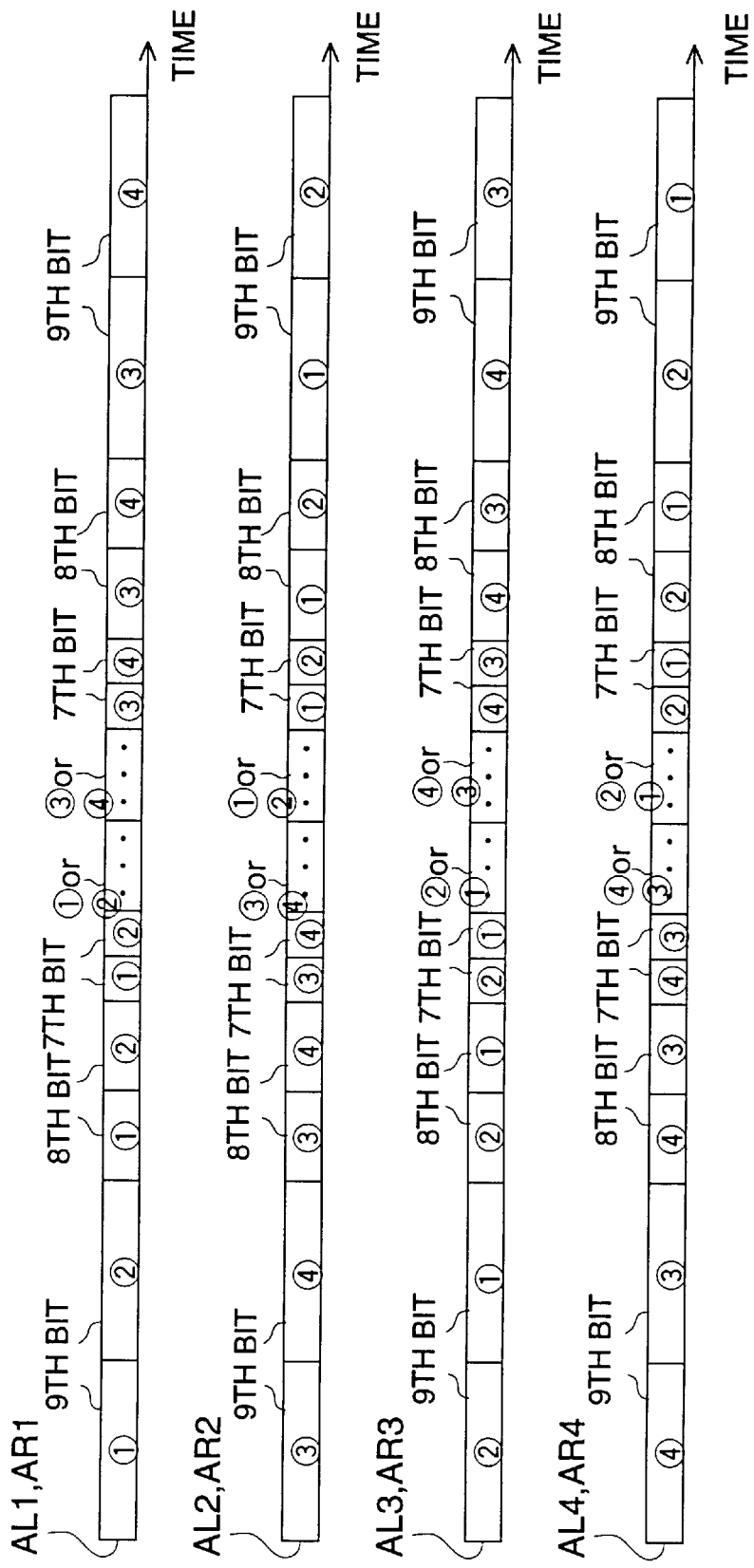
FIG. 20 is a serial image data transmission timing chart of the signal control circuit for blue light and green light in modified example 4.

Further, the 1 bit serial image data AL2 and AR2 are generated using timing (1)–(4) shown in the second uppermost column in FIG. 20 as the reference, from data of each pixel stored in memories MaL2, MaR2 or memories MbL2, MbR2 in the same manner as the above-description. The 1 bit serial image data AL3 and AR3 are generated using timing (1)–(4) shown in the third uppermost column in FIG. 20 as the reference, from data of each pixel stored in memories MaL3, MaR3 or memories MbL3, MbR3 in the same manner as the above-description. The 1 bit serial image data AL4 and AR4 are generated using timing (1)–(4) shown in the fourth uppermost column in FIG. 19 as the reference, from data of each pixel stored in memories MaL4, MaR4 or memories MbL4, MbR4 in the same manner as the above-description.

In order to control as described above, in the blue light-use and green light-use signal generating circuits, the signal generation control section 16 conducts the signal generating operation in the order from the $9^{th}$ bit to the $0^{th}$ bit by 2 units for each bit. Next, the signal generation control section 16 conducts the signal generating operation in the order from the $0^{th}$ bit to the $9^{th}$ bit by 2 units for each bit.

In the present invention, light emitting control time, representing a recording energy control unit, is one that is established in the apparatus in advance. When switching to such established units, a discriminator means to discriminate the types of recording materials is required.

In order to switch the established recording energy control unit based on information discriminated by the discriminator means, an switching means is provided in the invention.

A means, for automatically discriminating photosensitive materials, includes a method to directly discriminating photosensitive materials, or a method to discriminate the materials by means of information such as a magazine in which the photosensitive material is loaded.

A method to directly discriminate photosensitive materials includes, when a photosensitive material is of a roll type, a method wherein a tip portion is provided with information for discriminating photosensitive materials, and judgment is made based on that information. As information for discriminating, there are given a bar code, punched holes (number, size and pattern), reflectance under light irradiation, surface density of the photosensitive material, and surface colors. Either a single item of this information or a combination of two or more of the information can serve as information for discriminating.

As a method to discriminate by means of information such as a magazine in which a photosensitive material is loaded, when a magazine is used, and a photosensitive material is replaced together with the magazine when replacing the photosensitive material, discrimination information is provided on the magazine, while when replacing a photosensitive material, registration is made on the main body, thereby exposure can be carried out under appropriate conditions even when the photosensitive material is changed.

Even if no discrimination information is present on a magazine, it is possible to discriminate information of the width of the photosensitive material when the width of the photosensitive material is different (examples of 89 mm width or 127 mm width).

For occasions when discriminating by the use of information such as a bar code, there is a method wherein a bar code is put on a packing means for a photosensitive material, namely on a light-intercepting outer envelope, for example, to be discriminated by a bar code reader provided on the main body in the case of paper replacement, and information based on the discrimination is correlated with the magazine.

In the case of a disposable magazine-fitted photosensitive material (photosensitive material which can be used as a magazine as it is without prior loading in a magazine), there is a method wherein a bar code is provided on a dark box serving also as a magazine to be discriminated when the magazine is set into the main body.

Concrete Example (A)
Bar Code Reading Method

When paper sheets are loaded in a paper magazine, information of the bar code provided on the outer envelope for the paper is read by a bar code reader provided on the main body. On the bar code, there is information of the types of photosensitive materials, length, surface quality and paper size, which are read by the main body apparatus and are stored therein. When the paper magazine is mounted on the main body, information of paper size is obtained from the paper magazine, and the type of the photosensitive material read through the bar code previously is thereby identified, then, setting of the recording energy control unit in accordance with the identified type of photosensitive material is changed. For example, when 89 mm-wide paper of photosensitive material A and 127 mm-wide paper of photosensitive material B are mixed, information of 89 mm: A and 127 mm: B are stored in advance in a storage section inside the main body by the aforesaid means, and the optimum setting for photosensitive material A is made when information on the magazine is 89 mm, while the optimum setting for photosensitive material B is made when information on the magazine is 127 mm.

Concrete Example (B)
Punched Hole

A punched hole for identifying a type of a photosensitive material is formed on the tip portion of a roll of paper. When loading the paper into the main body, the paper width and type of photosensitive material are correlated with each other by a sensor and stored. Based on this information, it is possible to output optimum setting, in spite of magazine replacement, in the same way as in the foregoing.

In the invention, it is preferable that a discriminator means be an automatic one, but when a paper is not registered in terms of a channel and thereby is unable to be discriminated automatically, light emitting control time which is then capable of being set is used to output, the best setting is selected to be output, and thereby an optimum exposure condition is made, which is of course preferable.

When an image reading means is provided on the main body under the condition of no channel registration, it is possible to output the optimum conditions by reading outputted images with the image reading means and by discriminating it automatically. A discriminating standard in this case is a point where the density difference between exposures for each bit (a single exposure of $2^6$ and 6 exposures of $2^5+2^4+2^3+2^2+2^1+2^0$) is the smallest.

In the invention, when a recording energy control unit is equivalent to the light emitting control time, it is preferable that the light emitting control time is $a \times 2^n + \alpha_n$ (nsec) ($\alpha_n$ is an adjustment factor).

In this case, $\alpha_n$ is an adjustment factor of each light emitting control time necessary for obtaining continuous image tone, and it is determined based on experience for each switching characteristic, the amount of emitted light of each element, recording time and types of recording materials.

With regard to the light emitting control time, though a condition may be established in advance for a photosensitive material which is subjected to image forming, it is also preferable to establish it so that the light emitting control time may be a combination of different light emitting control times. When established in advance, it is sometimes necessary to establish different light emitting control times, depending on the LED array or VFPH which is used as a recording element.

The invention will further be explained in detail as follows, referring to the examples of the invention, and by which the invention is not limited.

Embodiment 1

Figure 13:
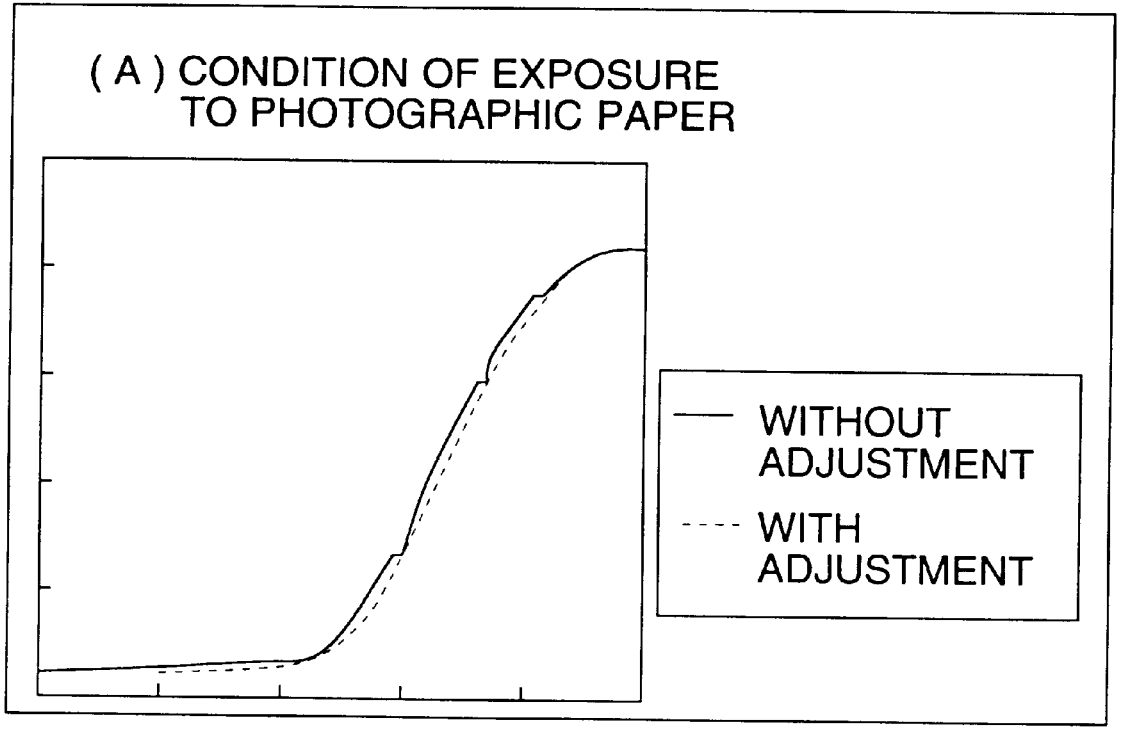
FIG. 13 is a graph showing the states of continuous tone, one of which depends on adjustment of light emitting control time in image output for photographic paper (A), and the other of which depends on no adjustment.

By using an LED print head, images were outputted in the form of a wedge on a photosensitive material (A) (hereinafter referred to as paper (A)) described in Embodiment 1 of Tokkaihei 7-49546, with a light emitting control time of $a \times 2^n$ and $a \times 2^n + \alpha_n$ (adjusted to the optimum condition), and the images were measured in terms of density, the results which are shown in FIG. 13.

| Conditions for paper (A) | |
| --- | --- |
| Light emitting control time: $a \times 2^n$ (Without adjustment) | Light emitting control time: $a \times 2^n \pm \alpha_n$ (With adjustment) |
| 2048 (×100 nsec) | 2048 |
| 1024 | 1024 |
| 512 | 514 (+2) |
| 256 | 258 (+2) |
| 128 | 130 (+2) |
| 64 | 66 (+2) |
| 32 | 34 (+2) |
| 16 | 18 (+2) |
| 8 | 10 (+2) |
| 4 | 6 (+2) |
| 2 | 4 (+2) |
| 1 | 3 (+2) |
| | Parenthesized figure represents $\alpha_n$ |

From FIG. 13, it is understood that continuous tone can not be obtained in the case of "Without adjustment" for light emitting control time, while continuous tone can be obtained in the case of "With adjustment" for light emitting control time.

Embodiment 2

A photosensitive material (B) (hereinafter referred to as paper (B)) obtained by modifying sulfur sensitizer in the aforesaid paper (A) was prepared.

Figure 14:
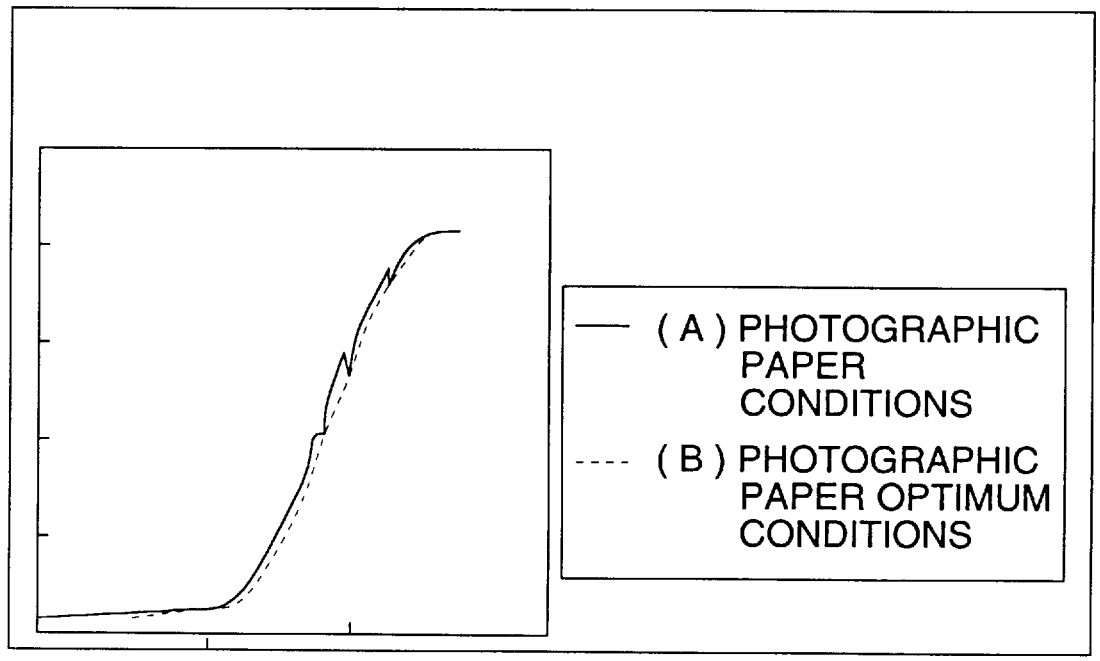
FIG. 14 is a graph showing the states of continuous tone, one of which represents an occasion wherein image output is conducted on photographic paper (B) under the condition of photographic paper (A), and the other of which represents an occasion wherein image output is conducted under the optimum condition for photographic paper (B).
Figure 15:
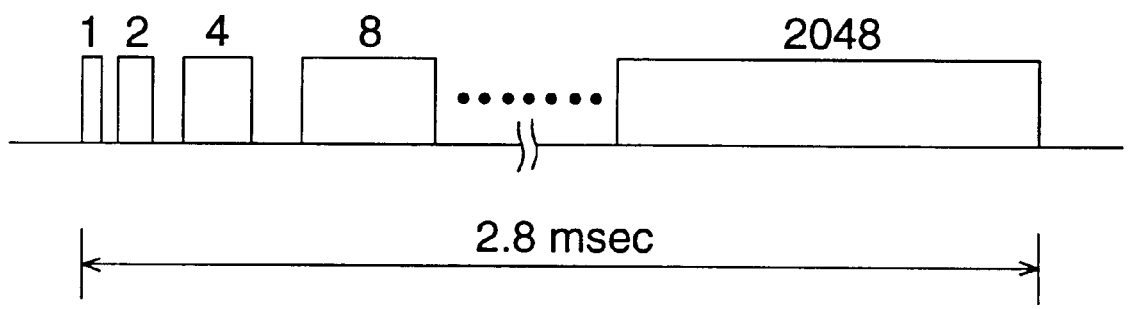
FIG. 15 is an illustration showing an example of bit separation multiple exposure.

FIG. 14 shows the results of outputting images on paper (B) under the condition for paper (A), and the results of outputting images under the optimum conditions for paper (B).

| Conditions for paper (A) | Optimum conditions for paper (B) |
| --- | --- |
| 2048 (×100 nsec) | 2300 (+252) |
| 1024 | 1200 (+176) |
| 514 (+2) | 526 (+15) |
| 258 (+2) | 262 (+2) |
| 130 (+2) | 130 (+2) |
| 66 (+2) | 66 (+2) |
| 34 (+2) | 34 (+2) |
| 18 (+2) | 18 (+2) |
| 10 (+2) | 10 (+2) |
| 6 (+2) | 6 (+2) |

-continued

| Conditions for paper (A) | Optimum conditions for paper (B) |
|---|---|
| 4 (+2) | 4 (+2) |
| 3 (+2) | 3 (+2) |

From FIG. 14, it is apparent that continuous tone can not be obtained because no optimum conditions exist even when images are outputted on paper (B) under the conditions for paper (A), but continuous tone can be obtained when images are outputted under the optimum conditions for paper (B).

Furthermore, the present invention can also be applied when a recording element is a laser. An example of such embodiments will be described briefly in the following.

Figure 16:
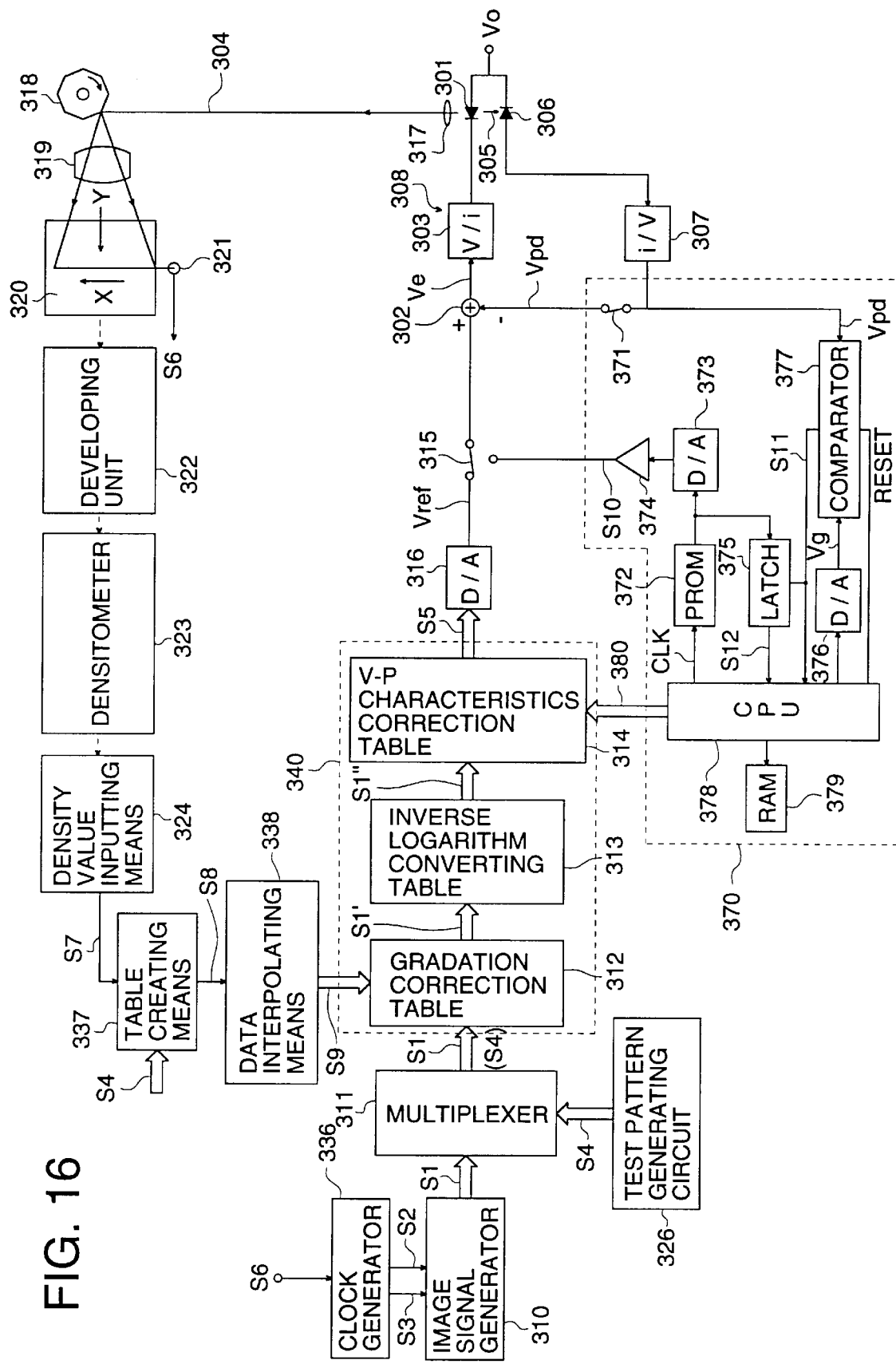
FIG. 16 is a structural diagram of a laser recording apparatus.

FIG. 16 shows an example of a laser recording apparatus embodies in the present invention. Image signal generator 310 generates image signal S1 which carries continuous tone images. Image signal S1 represents a digital signal which shows a continuous tone image having a density scale of 10 bits, for example. The image signal generator 310 switches signals equivalent to one primary scanning line based on line clock S2, and outputs image signal S1 for each pixel based on pixel clock S3. In the present example, an image clock frequency is set to 1 $MH_z$, namely, recording time for one pixel is set to 1 μsec.

Image signal S1 mentioned above passes through multiplexer 311, then is subjected to correction on the basis of correction table 340 composed of RAM, and is converted into light emission level command signal S5 of 16 bits, for example. Light emission level command signal S5 is inputted in D/A converter 316 where the light emission level command signal is converted to a light emission level command signal Vref as an analog voltage signal. The light emission level command signal Vref is inputted to addition point 302 of APC circuit 308 through signal change-over switch 315. Accordingly, light beam 304 having intensity which corresponds to the light emission level command signal Vref (namely to the image signal S1) is emitted from the semiconductor laser 301. The light beam 304 passes through collimator lens 317 and is transformed into a collimated beam there, and then, enters light deflector 318 such as a polygon mirror, for example, to be reflected and deflected there. Light beam 304 thus polarized is caused to pass through converging lens 319, composed usually of an fθ lens to be converged on photosensitive material 320 to be a minute spot which scans through (primary scanning) in the X direction on photosensitive material 320. Photosensitive material 320 is conveyed by an unillustrated conveyance means in the Y direction which is mostly perpendicular to the primary scanning direction X mentioned above, whereby sub-scanning of light beam 304 is achieved. Thus, photosensitive material 320 is subjected to two-dimensional scanning conducted by light beam 304 to be exposed to light. Since light beam 304 is modulated in terms of intensity based on image signal S1, as stated above, images with continuous tone carried by the image signal S1 are recorded on photosensitive material 320 as latent photographic images. Incidentally, when light beam 304 scans the surface of photosensitive material 320 as stated above, photo-detector 321 detects that light beam 304 passes through the starting point of the primary scanning, and starting point detection signal S6, outputted by photo-detector 321, is inputted into clock generator 336. Clock generator 336 outputs line clock S2 mentioned above as well as pixel clock S, in synchronization with input timing of starting point detection signal S6.

Then, photosensitive material 320 passes through developing unit 322 to be subjected to development processing there. Due to this, the continuous tone images cited previously are recorded on photosensitive material 320 as visual images.

Figure 17:
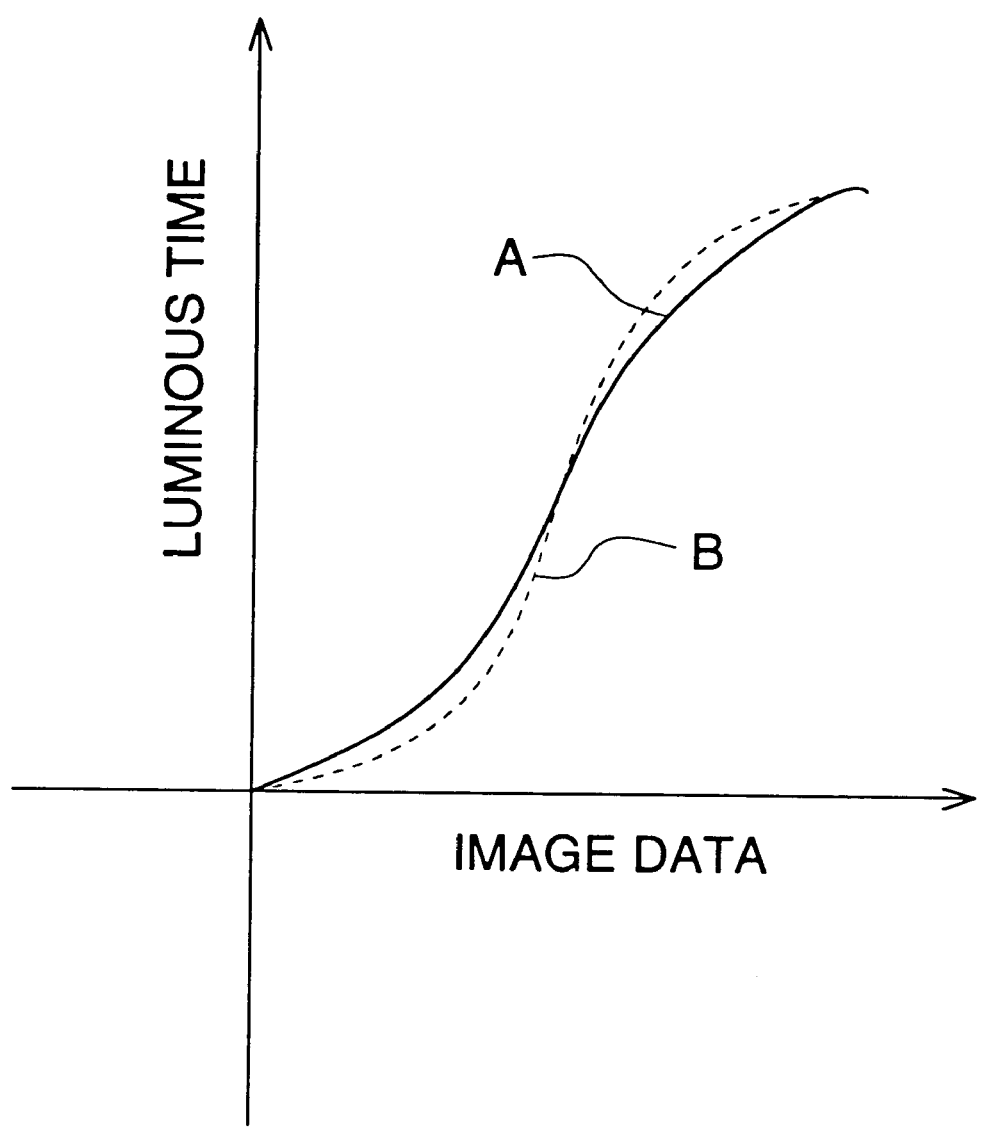
FIG. 17 is a graph showing luminous time corresponding to image data.

As an example of correction curves for image signal S1, FIG. 17 shows correction curves for two photosensitive materials in the relation between image data and luminous time, namely, type A (shown by the solid line) and type B (shown by the dotted line). As shown in FIG. 17, plural correction curves are stored in the aforementioned correction table 40 to compensate various types of photosensitive materials. The correction of image data is carried out on the basis of the correction curve which corresponds to the photosensitive material under image formation.

As described in the above, according to the present invention, it is possible to provide an image forming apparatus wherein an excellent image in continuous tone can be obtained to form images on a recording material by using a recording element even when photosensitive materials are different types.

What is claimed is:

1. An image recording apparatus comprising:

input means for inputting image data;

a recording element to record images on an image recording medium in accordance with said image data inputted by said input means;

memory means for storing a plurality of information groups, each information group including relationship between image data and recording energy control data, each of said recording energy control data being a combination of plural luminous times different from one another, and each of said plural luminous times being defined by the following equation;

$$\text{luminous time} = a \times 2^n \alpha_n \text{ (nanosecond)}$$

where,
n=number of luminous time,
a=time conversion coefficient,
$\alpha_n$=factor of adjustment;

discriminator means for discriminating a sort of said image recording medium;

selector means for selecting at least one information group out of said plural information groups in accordance with the sort of said image recording medium discriminated by said discriminator means; and control means for controlling said recording element on the basis of said information group selected by said selector means.

2. The image recording apparatus of claim 1, wherein:
said $\alpha_n$ varies in different values, depending on the sort of said image recording medium.

3. The image recording apparatus of claim 1, wherein said memory means stores each of said information groups on the basis of the correlation between the sort of said image recording medium and said recording energy control data.

4. The image recording apparatus of claim 1, wherein said recording element is a luminous element, and said image recording medium is one of various kinds of the silver-halide photo-sensitive materials.

5. The image recording apparatus of claim 1, wherein said discriminator means discriminates the sort of said image recording medium by detecting information directly recorded on said image recording medium.

6. The image recording apparatus of claim 5, wherein:

said image recording medium is a scrolled photo-sensitive material, and information for discriminating the sort of said photo-sensitive material is recorded on the top portion of the scroll.

7. The image recording apparatus of claim 6, wherein:

the information for discriminating the sort of said photo-sensitive material is detected from one of its properties including bar-code, punching holes, reflectivity, surface density of photo-sensitive material and surface color of it, or from a combination of more than one property thereof.

8. The image recording apparatus of claim 1, wherein said discriminator means discriminates the sort of said image recording medium by detecting information attached to apackage of said image recording medium.

9. The image recording apparatus of claim 1, wherein said discriminator means discriminates the sort of said image recording medium by detecting a dimensional information regarding to the width of said image recording medium.

10. The image recording apparatus of claim 1, wherein said recording element comprises a luminous element.

11. The image recording apparatus of claim 10, wherein the luminous element is incorporated in an array type recording head.

12. The image recording apparatus of claim 1, wherein said recording element is a laser light source.

13. The image recording apparatus comprising:

input means for inputting image data;

a recording element to record images on an image recording medium in accordance with said image data inputted by said input means;

memory means for storing a plurality of information groups, each information group including relationship between image data and recording energy control data, each of said recording energy control data being a combination of plural heating times different from one another, and each of said plural heating times being defined by the following equation;

$$\text{heating time} = a \times 2^n \alpha_n \text{ (nanosecond)}$$

where, n=number of heating time,
a=time conversion coefficient,
$\alpha_n$=factor of adjustment, discriminator means for discriminating a sort of said image recording medium;

selector means for selecting at least one information group out of said plural information groups in accordance with the sort of said image recording medium discriminated by said discriminator means; and control means for controlling said recording element on the basis of said information group selected by said selector means.

14. The image recording apparatus of claim 13, wherein said recording element comprises a heating element.

* * * * *